(12) United States Patent
Franson

(10) Patent No.: US 6,678,450 B1
(45) Date of Patent: Jan. 13, 2004

(54) OPTICAL METHOD FOR QUANTUM COMPUTING

(75) Inventor: James D. Franson, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/299,534

(22) Filed: Apr. 26, 1999

Related U.S. Application Data

(60) Provisional application No. 60/082,983, filed on Apr. 24, 1998.

(51) Int. Cl.⁷ .................................................. G02B 6/00
(52) U.S. Cl. ........................................ 385/122; 359/326
(58) Field of Search ................................ 385/122, 141, 385/142; 359/326, 108

(56) References Cited

U.S. PATENT DOCUMENTS

| | | | | |
|---|---|---|---|---|
| 4,734,579 A | * | 3/1988 | Lucatorto et al. | 250/282 |
| 4,829,597 A | * | 5/1989 | Gelbwachs | 359/141 |
| 5,771,117 A | * | 6/1998 | Harris et al. | 359/326 |

* cited by examiner

*Primary Examiner*—Euncha Cherry
(74) *Attorney, Agent, or Firm*—Francis A. Cooch

(57) ABSTRACT

An optical method for quantum computing that makes use of nonlocal effects to construct the quantum gates themselves. A nonlocal interaction in which pairs of atoms interchange two photons produces a large nonlinear phase shift. These nonlinear phase shifts are used to construct quantum logic gates, such as a Controlled-NOT.

4 Claims, 8 Drawing Sheets

Atom A   Atom B

Time →

Time →

PRIOR ART same medium different media

FIG. 12

| | Both photons in the same medium | Each photon in a separate medium |
|---|---|---|
| (a) After pulse 1 | — $\|0\rangle$ <br> —•— $\|\gamma_1\rangle$ <br> — $\|\gamma_1, \gamma_2\rangle$ | — $\|0\rangle$ <br> —•— $\|\gamma_1\rangle$ <br> — $\|\gamma_1, \gamma_2\rangle$ |
| (b) After pulse 2 | —○— $\|0\rangle$ <br> —○— $\|\gamma_1\rangle$ <br> — $\|\gamma_1, \gamma_2\rangle$ | — $\|0\rangle$ <br> —•— $\|\gamma_1\rangle$ <br> — $\|\gamma_1, \gamma_2\rangle$ |
| (c) After pulse 3 | —○— $\|0\rangle$ <br> $e^{i\phi}$ —○— $\|\gamma_1\rangle$ <br> — $\|\gamma_1, \gamma_2\rangle$ | — $\|0\rangle$ <br> —⊙— $\|\gamma_1\rangle$ <br> — $\|\gamma_1, \gamma_2\rangle$ |
| (d) After pulse 4 | — $\|0\rangle$ <br> $e^{i\phi}$ —•— $\|\gamma_1\rangle$ <br> — $\|\gamma_1, \gamma_2\rangle$ | — $\|0\rangle$ <br> —•— $\|\gamma_1\rangle$ <br> — $\|\gamma_1, \gamma_2\rangle$ |
| (e) After pulse 5 | — $\|0\rangle$ <br> — $\|\gamma_1\rangle$ <br> $e^{i\phi}$ —•— $\|\gamma_1, \gamma_2\rangle$ | — $\|0\rangle$ <br> — $\|\gamma_1\rangle$ <br> —•— $\|\gamma_1, \gamma_2\rangle$ |

OPTICAL METHOD FOR QUANTUM COMPUTING

CROSS-REFERENCE TO RELATED APPLICATION

This application claims the benefit of prior filed U.S. provisional application serial No. 60/082,983, filed Apr. 24, 1998.

STATEMENT OF GOVERNMENTAL INTEREST

This invention was made with Government support under Contract Nos. N00014-91-J-1485, MDA904-95-G-0363/5007 and DAAG55-98-1-0368 awarded by the Department of the Navy, National Security Agency and Department of the Army, respectively.

BACKGROUND OF THE INVENTION

The invention relates to quantum computing and, more specifically, is a novel optical method for constructing a quantum computer.

Many kinds of numerical problems cannot be solved using conventional computers because of the time required to complete the computation. For example, the computer time required to factor an integer containing N digits is believed to increase exponentially with N. It has been estimated that the time required to factor a 150-digit number using the fastest supercomputers currently available would be longer than the age of the universe. Future increases in the speed of conventional computers will clearly be inadequate for problems of that kind, which are often of considerable practical importance. For example, the difficulty in factoring large numbers forms the basis for the most commonly used methods of cryptography.

It has been shown that quantum-mechanical computers could use nonclassical logic operations to provide efficient solutions to certain problems of that kind, including the factoring of large numbers. As an example of a nonclassical logic function, consider the conventional NOT operation, which simply flips a single bit from 0 to 1 or from 1 to 0. In addition to the usual NOT, a quantum computer could also implement a new type of logic operation known as the square root of NOT. When this operation is applied twice (squared), it produces the usual NOT, but if it is applied only once, it gives a logic operation with no classical interpretation.

In addition to performing nonclassical logic operations, quantum computers will be able to perform a large number of different calculations simultaneously on a single processor, which is clearly not possible for a conventional computer. This quantum parallelism is responsible for much of the increased performance of a quantum computer.

The operation of individual quantum logic gates has been demonstrated, but no operational quantum computer has been constructed. The eventual goal is to produce large numbers of quantum logic gates on a single substrate, in analogy with current semiconductor technology, which would allow the development of quantum computers for practical applications.

Quantum computers will use a binary representation of numbers, just as conventional computers do. An individual quantum bit, often called a qubit, will be physically represented by the state of a quantum system. For example, the ground state of an atom could be taken to represent the value 0, while an excited state of the same atom could represent the value 1. In the optical approach of the invention to quantum computing, a 0 is represented by a single photon in a given path. The same photon in a different path represents a 1.

Although classical bits always have a well-defined value, qubits often have some probability of being in either of the two states representing 0 and 1. It is customary to represent the general state of a quantum system by $|\psi\rangle$, and we will let $|0\rangle$ and $|1\rangle$ represent the states corresponding to the values 0 and 1, respectively. Quantum mechanics allows superpositions of these two states, given by $$|\psi\rangle = \alpha|0\rangle + \beta|1\rangle$$

where $\alpha$ and $\beta$ are complex numbers. The probability of finding the system in the state $|0\rangle$ is equal to $\alpha^2$ the probability of the state $|1\rangle$ is $\beta^2$.

Quantum-mechanical superpositions of this kind are fundamentally different from classical probabilities in that the system cannot be considered to be in only one of the states at any given time. For example, consider a single photon passing through an interferometer, as illustrated in FIG. 1, with phase shifts $\phi_1$ and $\phi_2$ inserted in the two paths. A beam splitter gives a 50% probability that the photon will travel in the upper or the lower path. If a measurement is made to determine where the photon is located, it will be found in only one of the two paths. But if no such measurement is made, a single photon can somehow measure both phase shifts $\phi_1$ and $\phi_2$ simultaneously, since the observed interference pattern depends on the difference of the two phases. This suggests that in some sense a photon must be located in both paths simultaneously if no measurement is made to determine its position. In a more complicated interferometer with many paths, a single photon can simultaneously measure a linear combination of the phase shifts in all of the paths even though it can be detected in only one of the paths.

The ability of a quantum computer to perform more than one calculation at the same time is analogous to the properties of the single-photon interferometer just described. A quantum computer can provide results that depend on having performed a large number of calculations, even though a measurement to determine exactly what the computer was doing would show that it was programmed to perform only one specific calculation. To illustrate this, consider a computer programmed to perform a specific calculation based on the value of N input bits, and assume that the result can be described by N output bits, as illustrated in FIG. 2. There are $2^N$ different combinations of input bits, each of which corresponds to a specific input state denoted by $|input_j\rangle$, where j takes on all the values from 1 to $2^N$. The equal number of specific combinations of output bits is denoted by $|output_k\rangle$. Each input state can produce a superposition of possible output states, $$|input_j\rangle \rightarrow \sum_{k=1}^{2^N} \beta_{jk} |output_k\rangle$$

where the complex coefficients $\beta_{jk}$ describe the calculation performed. In addition, the input state can be a superposition of all of the possible inputs to the computer:

$$|input\rangle = \sum_{j=1}^{2^N} a_j |input_j\rangle. \quad P_u = |\Sigma|^2$$

In that case, the linearity of quantum mechanics gives an output state of the form $$|output\rangle = \sum_{j=1}^{2^N} a_j \sum_{k=1}^{2^N} b_{jk} |output_k\rangle.$$

The probability $P_k$ of getting a specific output state k is then given by the square of its coefficient in the immediately preceding equation:

$$P_k = u \sum_{j=1}^{2^N} a_j b_{jk} u^2.$$

It can be seen that the probability of getting a particular output depends on all of the coefficients $\beta_{jk}$, which represent the results of all possible calculations on the computer. The result also depends on interference between all of the possible inputs, in the sense that $P_k$ will be large if all of the input states contribute in phase with each other. Conversely, $P_k$ will be small if the contributions from all of the initial states cancel out. The goal of quantum computing is to program the computer in such a way that the desired result occurs with high probability while all incorrect results occur with negligible probability.

To illustrate the usefulness of superposition states of this kind, suppose that we want to calculate the quantity Q, $$Q = \sum_{j=1}^{2^N} e^{ij} f(j),$$

where $f(j)$ is a highly nonlinear function of j. The quantity Q corresponds to a weighted average of the function $f$ over all possible inputs to the computer, which is a Fourier transform of sorts. Calculations of this kind could be implemented on a quantum computer by programming the computer itself to calculate $f(j)$ and then creating a superposition of input states corresponding to the desired weighted average.

It has been shown that quantum computers could be used to efficiently factor large numbers, which is responsible for much of the current interest in quantum computing. The algorithm involved uses interference effects to ensure that, with high probability, the output of the computer will correspond to one of the desired factors.

Any practical implementation of a quantum computer will probably require a modular approach in which many separate logic gates can be connected with some equivalent of the wiring in a conventional computer. The ability to correct for the growth of errors in the quantum states, known as decoherence, is also essential. Individual quantum gates have been demonstrated using the nuclear spins of ions in a trap. This approach is not modular, however, and the transfer of information from one ion to another is a very complex process.

An optical approach to quantum computing appears to offer a number of practical advantages. All quantum computers are inherently dependent on interference effects and must maintain the appropriate phases. Optical interferometers are widely used in many current applications because their phase is relatively stable and can be controlled using feedback techniques. Interferometers based on charged particles, such as electrons, do exist but are very sensitive to stray electromagnetic fields. In addition, optical fibers or waveguides could readily be used to connect optical quantum gates as needed to perform the desired logic operations. For these and other reasons, the most practical approach to the construction of quantum computers will likely be based on the use of optical devices.

The primary difficulty in such an optical approach is that nonlinear effects of this kind typically require high-intensity electric fields, whereas the electric field associated with a single photon is normally quite weak. However, the field from a single photon is inversely proportional to the square root of the volume that it occupies, and confining a photon to a sufficiently small volume can produce electric fields as high as 10,000 V/m. Nonlinear phase shifts of this kind at the two-photon level have been demonstrated, but the approach involves the use of extremely high-quality mirrors, atomic beams, and operation near the resonant frequency of the atoms in the medium, none of which appear to be practical for the construction of a working quantum computer.

SUMMARY OF THE INVENTION

It was recently shown that any logic operation or numerical calculation can be implemented by combining a sufficient number of the controlled-NOT (XOR) gates illustrated in FIG. 3 with additional single-bit operations that are easily implemented. The controlled NOT has two binary inputs, A and B. Input A is always transferred to the output without change, while input B is inverted (flipped) if and only if input A=1. Thus, input A can control what happens to input B. The development of a practical controlled-NOT gate is the first step toward the construction of a quantum computer.

A controlled-NOT gate can be implemented using the optical arrangement illustrated in FIG. 4. Here, bit A has the value 1 if a single photon is in the path indicated by the dashed line, whereas it has the value 0 if that photon is in the path indicated by the solid line. Input B is represented in a similar way by a second photon; the two photons have different frequencies $\omega_1$ and $\omega_2$, which allow them to be distinguished. The two paths for photon B are combined by a beam splitter to form an interferometer with one arm passing through a nonlinear medium. The phase shift experienced by photon B depends on the index of refraction of the medium, which in turn depends on the strength of the electric field at that location (Kerr effect). If photon A passes through the medium at the same time, its electric field will introduce an additional $\pi$ phase shift, which changes the output path that photon B must take. The net result is that photon A can control the path of photon B.

The approach of the invention is based on a new physical effect that should greatly enhance these kinds of nonlinear phase shifts. Earlier nonlinear mechanisms involved the interaction of two photons with individual atoms, which gives a phase shift proportional to the number $N_A$ of atoms in the medium. The new mechanism involves the interaction of two photons with pairs of atoms, which gives a phase shift proportional to $N_A^2$, since that is the number of pairs of atoms in the medium. As FIG. 5 shows, the proposed mechanism consists of the absorption of photon 1 and the emission of photon 2 by atom A, followed by the absorption of photon 2 and the emission of photon 1 by atom B. (The energy of a quantum-mechanical system is uncertain over small time intervals and need not be conserved during the intermediate steps of this process.) This exchange of the photons by a pair of atoms has no net effect other than to cause a shift in the energy of the system, which produces the desired phase shift.

For large values of $N_A$, this new mechanism should produce much larger phase shifts at the two-photon level. This in turn will allow other design requirements to be relaxed, such as the need for high-quality mirrors or atomic beams. As a result, this approach is eventually expected to allow the construction of large numbers of quantum gates on a single substrate, with optical waveguides to provide the necessary logical connections.

The main advantages of the invention over other techniques are:

independent logic gates;

ability to make connections between the independent logic gates using optical fibers or waveguides;

low error rate (decoherence) due to the ability to operate at large frequency detunings;

potential ability to fabricate large numbers of logic devices on a single substrate using optical waveguides and micro-fabrication techniques, in analogy with semi-conductor technology;

high rate of logic operations due to the propagation of information at the speed of light; and compensation for the effects of dispersion.

As a result of these advantages, the method of the invention is expected to provide a practical means of scaling-up to a full-size computer. Furthermore, the method disclosed herein can be applied to conventional optical data processing, i.e., the optical approach described above can be used to build a standard computer to increase speed and reduce heat generated by the components.

BRIEF DESCRIPTION OF THE DRAWINGS

FIG. 12 illustrates a five-pulse sequence producing a nonlinear phase shift of $\pi$.

DETAILED DESCRIPTION

Figure 1:
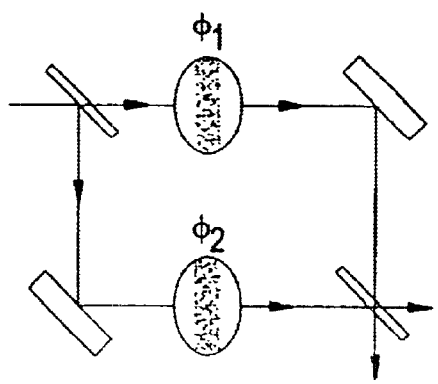
FIG. 1 illustrates a single photon passing through an interferometer.
Figure 2:
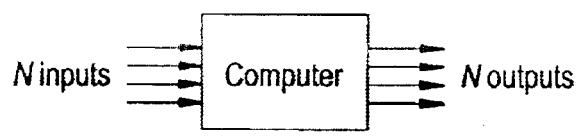
FIG. 2 illustrates a general purpose quantum computer with N input bits and N output bits.
Figure 3:
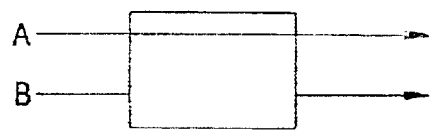
FIG. 3 illustrates a controlled-NOT (XOR) gate.

Nonlinear optical effects normally require high-intensity beams of light containing many photons. Roughly speaking, this is because the electric field associated with a single photon is very weak, which causes the physical interaction of a single photon with another particle to be correspondingly small. One way to avoid this difficulty is to confine two photons to a small cavity with a high Q factor, which increases both the magnitude of the electric field and the interaction time. Although nonlinear phase shifts at the two-photon level have been demonstrated in this way, the complexity of the required high-Q cavities and atomic traps may limit the practical value of these techniques in the construction of full-scale quantum computers containing large numbers of qubits.

Even when there is no physical interaction between two identical particles, the requirement that the wave function be symmetric or anti-symmetric under their exchange can produce an apparent tendency of the particles to either repel or attract each other, the simplest example being that of photon bunching. There can be no real attraction or repulsion in such a case, since there is no actual force between the two particles, but in many respects the net effect is much the same as if there were. Exchange interactions have a major impact in many systems, where relatively strong physical forces would be required to produce any equivalent effect, such as is the case in a neutron star.

The relatively large magnitude of exchange interactions suggests that it may be possible to construct optical quantum logic gates in such a way that the required nonlinear interaction is derived from exchange interactions rather than the relatively weak physical interactions of the photons. As we will show below, the probability of there being two virtually-excited atoms in a medium can be a factor of two larger when two off-resonant photons propagate through the same medium as compared to the case in which they propagate through two separate media, in analogy with photon bunching. This difference in the population of the excited atomic states can be exploited by applying a sequence of laser pulses to produce phase shifts in the excited states of the atoms. Since the effects of the laser pulses are dependent on the population of the excited states, a different phase shift is obtained when the two photons are in the same medium than is obtained when they propagate through two separate media, which corresponds to a nonlinear effect. We have also considered several other approaches that appear to be less effective, as described in one of the appendices, including an earlier suggestion that relied on collisions with a buffer gas rather than laser pulses.

The difficulty in obtaining nonlinear interactions at the two-photon level by conventional means can be seen by considering the probability that an off-resonant photon passing through a medium, such as an atomic vapor cell, will interact with an atom in the medium. This probability can be made to be on the order of unity by simply increasing the number of atoms in the medium, but the probability that two photons will interact with the same atom in such a medium will typically be very small. For example, if the medium contains $10^{10}$ atoms and the total probability of an interaction is on the order of unity, then the probability that two photons will interact with the same atom will be on the order of $10^{-10}$. Any nonlinear optical process that requires both photons to interact with the same atom might therefore be expected to be negligibly small. In contrast, the exchange interaction of interest here involves pairs of atoms and does not require both photons to interact with the same atom.

Figure 6:
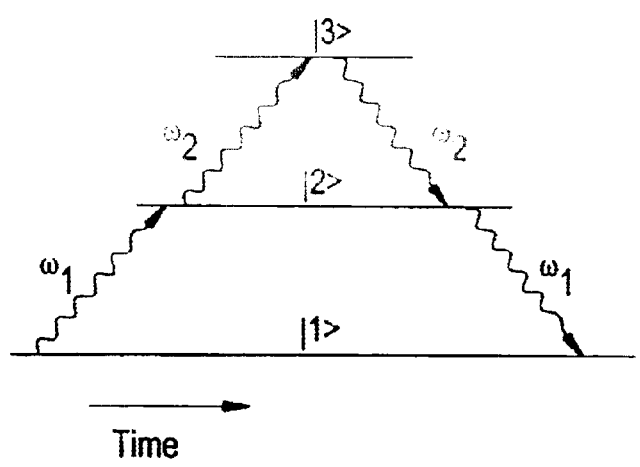
FIG. 6 illustrates a conventional mechanism for the production of nonlinear phase shifts.

As an example, a conventional process for the production of nonlinear phase shifts (Kerr effect) is illustrated in FIG. 6. Here two photons with frequencies $\omega_1$ and $\omega_2$ interact with a three-level atom. The frequency of photon 2 is relatively close to the transition frequency between atomic levels 2 and 3, so that virtual transitions in which photon 2 is absorbed and then re-emitted would produce a phase shift for photons of that frequency. Virtual transitions of that kind can only occur if photon 1 has previously been absorbed by the atom, since the atom would otherwise be in its ground state and not in level 2 at room temperature. The net result is that the presence or absence of photon 1 can control the phase shift experienced by photon 2. This requires photons 1 and 2 to interact with the same atom, which is very unlikely at single-photon intensities, and conventional mechanisms of this kind are usually not significant at single-photon intensities as a result. To the best of our knowledge, all previous mechanisms for the production of nonlinear phase shifts at low intensities require two photons to interact with the same atom. Classical arguments based on the flow of information suggest that this must always be the case, as will be discussed in more detail below.

Figure 5:
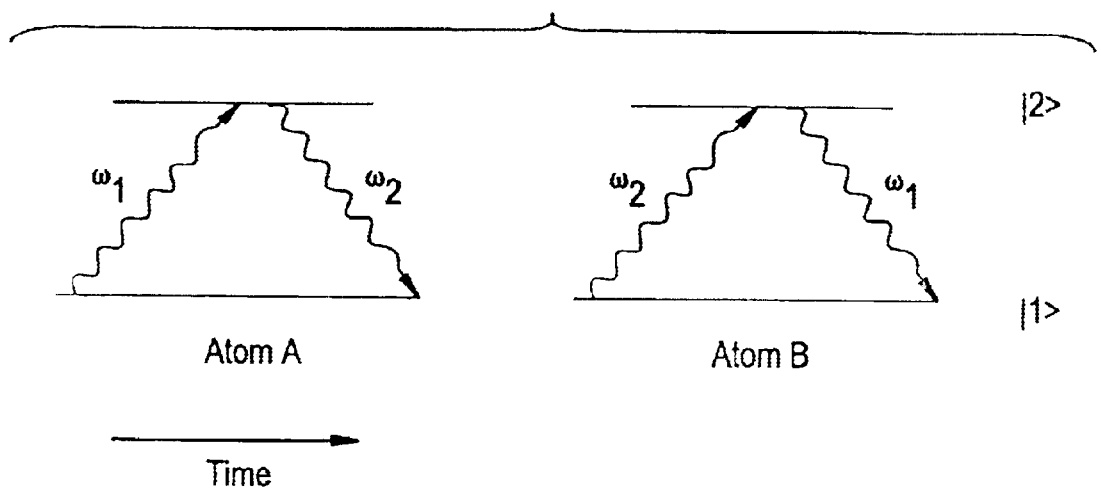
FIG. 5 illustrates predicted mechanism for the enhancement of nonlinear phase shifts at the two-photon level.

We are concerned, instead, with processes in which two photons interact with two different atoms in a medium, such as those labeled A and B in FIG. 5. In this virtual process, atom A absorbs photon 1 and re-emits photon 2, while atom B absorbs photon 2 and re-emits photon 1. This exchange of the two photons will produce an energy shift that can be calculated using perturbation theory, for example, which in turn will produce a shift in the overall phase of the system. If the number N of atoms in the medium is sufficiently high that each photon has a probability on the order of unity of being absorbed by an atom, then the probability amplitude for a process of this kind would also be expected to be on the order of unity. Since the number of pairs of atoms is proportional to $N^2$, the expected nonlinear phase shift should also be proportional to $N^2$ in the weak coupling limit, whereas conventional mechanisms in which both photons interact with the same atom give a nonlinear phase shift proportional to N. We previously showed, however, that the contributions from all Feynman diagrams of this kind cancel out and give no net effect unless the system is perturbed in some way, such as by collisions with a buffer gas. More detailed calculations have subsequently shown that the use of a buffer gas for this purpose is strongly dependent on the nature of the collision process and that the random nature of the collisions would also introduce undesirable phase noise.

Figure 7A:
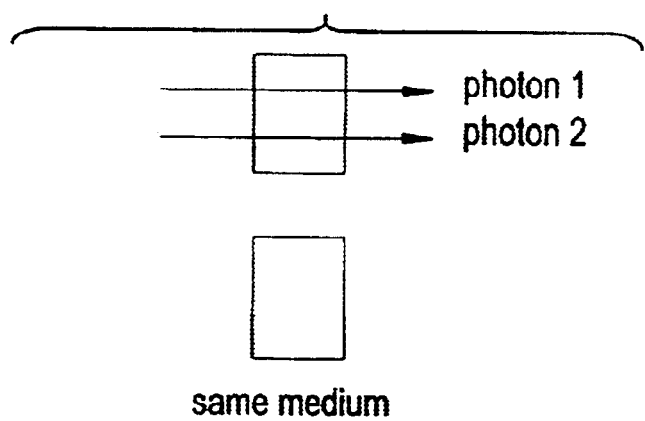
FIG. 7, consisting of FIGS. 7(a) and 7(b), illustrate, respectively, two photons passing through an optical medium and the same two photons passing through two separate media.
Figure 7B:
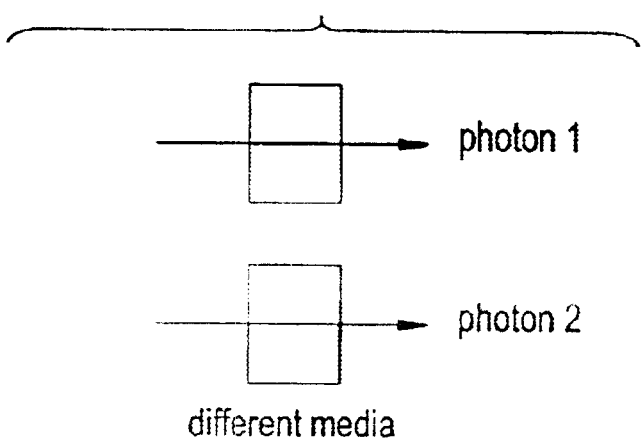
Figure 8:
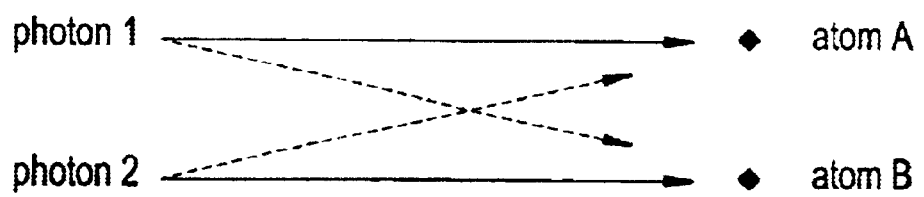
FIG. 8 illustrates a virtual state in which atoms A and B are both excited.
Figure 9A:
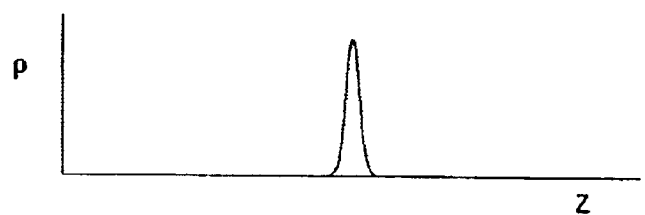
FIG. 9, consisting of FIGS. 9(a) and 9(b), illustrates, respectively, an atomic medium whose density p is a slowly-varying function of position z and a periodic medium.
Figure 9B:
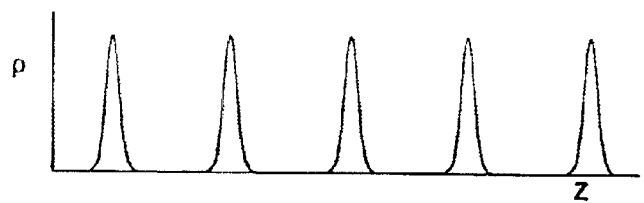

The difficulties associated with the use of collisions can be avoided by using laser pulses to perturb the excited states of the atoms, and the remainder of this paper will concentrate on that approach. Perhaps the simplest way to understand this mechanism is to consider the probability $P_2$ that two atoms will be in virtually-excited states at the same time when two non-resonant photons pass through the same medium, as illustrated in FIG. 7(a). We show below that $P_2$ is a factor of 2 larger when both photons pass through the same medium than is the case when the two photons pass through two separate but otherwise identical media, as illustrated in FIG. 7(b). This increased probability is due to the fact that atom A may have been excited by photon 1 while atom B was excited by photon 2, or atom A may have been excited by photon 2 while atom B was excited by photon 1, as illustrated in FIG. 8. The probability amplitudes for these two processes will constructively interfere provided that $$\delta k \cdot \delta r < \pi/2 \qquad (1)$$

where $\delta k$ is the difference in the k vectors of the two photons and $\delta r$ is the difference in the positions of the two atoms. This is the same condition that is required for the observation of the Hanbury-Brown and Twiss effect (photon bunching) and FIG. 8 is analogous to that effect if atoms A and B are viewed as two "detectors" placed in front of a well-collimated source.

The factor of 2 difference in $P_2$ can be exploited by applying a laser pulse to produce a phase shift in the excited states of the atoms in the medium. As mentioned above, the effects of the laser pulse will depend on the population of the excited atomic states and a different phase shift will therefore be produced when the two photons propagate together through the same medium than when they propagate through two different media. This corresponds to a nonlinear phase shift whose origin ultimately derives from the exchange interaction of FIG. 8. A suitable sequence of such laser pulses can give a nonlinear phase shift of $\pi$, which can then be used in an interferometer arrangement to produce a Controlled-NOT (XOR) quantum logic gate.

We begin by defining the system of interest and describing the corresponding state vector and Hamiltonian. By neglecting scattering and dispersion, which are both small for large photon detunings, and by making the adiabatic approximation, the quantum state of the entire system can be described by a set of six complex numbers that are taken to be the elements of an effective six-dimensional state vector. The propagation of the photons through the medium and their interaction with the laser pulses can then be determined by solving a six-dimensional eigenvalue problem. After considering the simplest case of a single laser pulse, the choice of an optimal sequence of laser pulses is described. We conclude with a discussion of the non-classical nature of these results and their inconsistency with classical concepts such as the flow of information and determinism.

The optical medium will be assumed to be an atomic vapor cell for simplicity, although the basic results should apply equally well to solid-state materials. Equation (1) can be satisfied for a medium with a moderate thickness L if the difference in frequencies of the two incident photons is much less than their average frequency and they propagate in the same direction. For example, $\omega_1-\omega_2$ may be on the order of a few GHz in a typical experiment, which would allow the thickness of the vapor cell to be on the order of 1 cm. In order to minimize reflections from the surface of the medium, it will be assumed that the density of atoms in the medium is slowly varying compared to the wavelength of the photons, as illustrated in FIG. (9a). The total number N of atoms in the medium will be assumed to be large ($\sim 10^{10}$).

The thickness of the atomic medium can be substantially increased while still satisfying Equation (1) by using a periodic density of atoms as illustrated in FIG. (9b), where it is assumed that the photons are propagating in the z direction. Here the thin structure of FIG. (9a) is repeated at intervals $\Delta z$ for which $\Delta z\, \delta k = 2p\pi$, where p is an integer. This approach is somewhat similar to the commonly-used technique of quasi-phase matching and would allow moderate values of L even for relatively large differences in the frequencies of the two photons. For simplicity, we will assume the geometry of FIG. (9a) throughout this paper, but the results can be readily extended to the periodic case.

The effects of interest involve two-level atoms, as in FIG. (5), but it will be necessary to vary the energy of the upper atomic levels in a time-dependent manner by applying external fields to the system. This could be done in a variety of ways but, to be specific, we will assume that a laser beam is used to couple the second atomic level to a third atomic state that is of no other interest, as illustrated in FIG. (10). Here photons 1 and 2 are slightly off resonance with the atomic transitions between levels 1 and 2, while the laser beam is sufficiently far from resonance with the atomic transition between levels 2 and 3 that no significant population transfer into level 3 occurs. In that case, the net effect of the laser beam is to shift the energy of level 2 by an amount that can be calculated using perturbation theory or other methods (AC Stark shift). The lack of population in level 3 allows us to use a two-level model for the atoms in which the energy $e_A$ of level 2 is a function of time.

The incident photons are assumed to propagate along the z direction and are represented by multi-mode Fock states (not merely weak coherent states) corresponding to gaussian wave packets. The temporal width $\tau_p$ of the wave packets is assumed to be much longer than the transit time L/c through the medium, so that the magnitude of the electric field of the photons is essentially uniform throughout the medium. The effects of interest require a multi-mode analysis, since the nonlinear phase shift depends on the expectation value of the product of the intensities of the two photons, which would vanish for plane-wave single photons in free space. The incident photons can be represented by two single-photon creation operators, $a_1^\dagger$ and $a_2^\dagger$, defined by $$a_1^\dagger = \sum_k f_1(k) a_k^\dagger \qquad (2)$$

$$a_2^\dagger = \sum_k f_2(k) a_k^\dagger$$

Here the operator $a_k^\dagger$ creates a plane-wave photon with wave vector k, and $f_1(k)$ and $f_2(k)$ are the Fourier coefficients of the gaussian wave packets at the initial time $t_0$. These coefficients are chosen in such a way that the inverse Fourier transforms are given by $$G_1(z) \equiv \frac{1}{\sqrt{2\pi}} \int e^{ik\cdot r} f_1(k) d^3k = g e^{i\bar{k}_1 z} e^{-(z-z_0)^2/2c^2\tau_p^2} \qquad (3)$$

$$G_2(z) \equiv \frac{1}{\sqrt{2\pi}} \int e^{ik\cdot r} f_2(k) d^3k = g e^{i\bar{k}_2 z} e^{-(z-z_0)^2/2c^2\tau_p^2}$$

where g is a constant and $z_0$ is the initial location of the center of the wave packets, which is taken to be far from the location of the atoms so that there is initially no interaction. Both wave packets have the same amplitude and width but different values for their central k-vectors, $\bar{k}_1$ and $\bar{k}_2$, which are related to the central frequencies of their Fourier spectra by $\bar{\omega}_1 = c k_1$ and $\bar{\omega}_2 = c k_2$. Both the medium and the photon wave packets are assumed to have no significant spatial variation in the transverse direction, so that the right-hand side of Equation (3) involves only the z coordinate. The main results of this paper depend only on the assumption that the modulus of $G_1(z)$ and $G_2(z)$ is a slowly varying function of z and the exact shape of the wave packets is not essential.

The initial state of the field is then given by $$|\gamma_1, \gamma_2\rangle = a_1^\dagger a_2^\dagger |0\rangle \qquad (4)$$

where $|0\rangle$ is the vacuum. We will also consider the single-photon states defined by $$|\gamma_1\rangle = a_1^\dagger |0\rangle$$

$$|\gamma_2\rangle = a_2^\dagger |0\rangle \qquad (5)$$

as well as the following states containing two identical photons $$|\gamma_1, \gamma_1\rangle = \frac{1}{\sqrt{2}} (a_1^\dagger)^2 |0\rangle \qquad (6)$$

$$|\gamma_2, \gamma_2\rangle = \frac{1}{\sqrt{2}} (a_2^\dagger)^2 |0\rangle$$

All of the atoms are assumed to be in their ground state initially, so that the quantum state of the system is initially given by $$|\Psi(t_0)\rangle = |\gamma_1, \gamma_2\rangle \prod_i |\psi_{1i}\rangle \qquad (7)$$

where $|\psi_{1i}\rangle$ represents atom i in its ground state.

It will be convenient to write the Hamiltonian H as the sum of two parts:

$$H = H_0 + H_{int} \qquad (8)$$

$H_0$ represents the energies of the field and the atoms in the absence of any interaction and is given as usual by $$H_0 = \sum_k \left( a_k^\dagger a_k + \frac{1}{2} \right) \hbar \omega_k + \sum_i \frac{1}{2} e_A \sigma_{zi} \qquad (9)$$

where the atoms are labeled with index i, $e_A$ is the energy of the excited state (level 2) of an atom above its ground state, and $\sigma_{zi}$ is one of the Pauli spin matrices in a two-dimensional Hilbert space consisting of the ground and excited states of atom i. (This does not imply any spin interactions.) The interaction Hamiltonian $H_{int}$ in the Coulomb gauge and in the standard dipole approximation is given by $$H_{int} = -q \sum_i r_i \cdot E(R_i) \qquad (10)$$

Here q is the charge of the electron and $r_i$ is the relative coordinate of the electron in atom i, where we are assuming hydrogen-like atomic states. $E(R_i)$ is the second-quantized electric field operator at the location $R_i$ of the center of mass of atom i, which is given in the Schrodinger picture and MKSA units by $$E(R) = i \sum_{k,j} \left(\frac{\hbar ck}{2\varepsilon_0 V}\right)^{1/2} [\lambda_j e^{ik \cdot R} a_k - \lambda_j^* e^{-ik \cdot R} a_k^\dagger] \quad (11)$$

Here $\varepsilon_0$ is the permittivity of the space, V is the volume used for periodic boundary conditions, and $\lambda_j$ represents the two orthogonal polarization states of a photon. Except for the discussion regarding symmetry considerations in Appendix A, both photons will be assumed to have the same state of polarization and the polarization indices will be dropped, since two photons of orthogonal polarizations cannot undergo an exchange interaction as shown in FIGS. (5) and (8) by means of dipole transitions.

The photon wave packets are not eigenstates of $H_0$ and they will propagate at the speed of light in the absence of any interactions. As a result, it is much more convenient to work in the interaction picture, where the photon state vectors remain constant in the absence of any interaction and the electric field operator becomes time dependent. Schrodinger's equation then involves only the interaction Hamiltonian H'(t):

$$i\hbar \frac{d|\Psi\rangle}{dt} = H'(t)|\Psi\rangle \quad (12)$$

where $H'(t) = \exp[iH_0(t-t_0)/\hbar]$ H' $\exp[-iH_0(t-t_0)/\hbar]$ as usual. H'(t) will be found to be a slowly-varying function of time after a suitable unitary transformation, which will allow the adiabatic approximation to be used to reduce the solution of the Schrodinger equation to an eigenvalue problem. The eigenvectors can be computed numerically or analytically, but in either case we will need the matrix elements of H'(t) in a suitable basis.

The postulates of quantum mechanics allow us to choose any set of orthonormal basis vectors in Hilbert space (Fock space for the photons). The nonlinear phase shifts of interest correspond to a coherent process in which the photons propagate out of the medium in the same state in which they entered it, aside from an overall phase factor. As a result, it will be convenient to choose a set of basis vectors in Fock space that includes the original state $|\gamma_1, \gamma_2\rangle$ as well as the states $|\gamma_1\rangle$ and $|\gamma_2\rangle$ that can arise as a result of virtual absorption of the photons while they are in the medium. Since we need a complete set of orthonormal basis vectors, we define a set of modified plane-wave creation operators $b_k^\dagger$ that are constructed in such a way that they generate states that are orthogonal to those generated by $a_1^\dagger$ and $a_2^\dagger$:

$$b_1^\dagger = c_n[a_k^\dagger - f_1^*(k)a_1^\dagger - f_2^*(k)a_2^\dagger] \quad (13)$$

Here $c_n$ is a normalization constant and the last two terms provide the desired orthogonality. Both $[a_1, a_2^\dagger]$ and $\langle\gamma_1|\gamma_2\rangle$ become exponentially small when $|\omega_1 - \omega_2|$ is much larger than the frequency spread of the gaussian wave packets, which will be assumed to be the case, and the set of operators $a_1^\dagger$, $a_2^\dagger$, and $b_k^\dagger$ obey the usual commutation relations in that limit. This allows us to choose a set of basis vectors that consists of all of the states that are generated by $a_1^\dagger$, $a_2^\dagger$, and the $b_k^\dagger$ at the initial time $t_0$. By definition, these basis vectors are independent of time in the interaction picture whereas, in the Schrodinger picture, they correspond to freely-propagating wave packets that do not include the effects of interactions.

The relevant matrix elements can now be calculated in this basis. For example, we will need the matrix elements $\mathscr{E}_1(R_i,t)$ and $\mathscr{E}_2(R_i,t)$ of the electric field operator defined by $$\mathscr{E}_1(R_i,t) = \langle 0|E(R_i,t)|\gamma_1\rangle$$
$$\mathscr{E}_2(R_i,t) = \langle 0|E(R_i,t)|\gamma_2\rangle \quad (14)$$

Making use of Equations (2), (5), and (11) allows $\mathscr{E}_1(R_i,t)$ to be written as $$\mathscr{E}_1(R_i,t) = i\left(\frac{\hbar c \bar{k}_1}{2\varepsilon_0 V}\right)^{1/2} \langle 0| \quad (15)$$

$$\left| e^{iH_0(t-t_0)/\hbar} \sum_k [e^{ik \cdot R_1} a_k - e^{-ik \cdot R_i} a_k^\dagger] e^{-iH_0(t-t_0)/\hbar} \sum_p f_1(p) a_p^\dagger |0\rangle \right|$$

Here we have approximated the term $\hbar ck$ as a constant over the narrow bandwidth of the photons, which allows it to be taken outside of the sum. The commutation relations eliminate all terms except those where k=p, the remaining sum can be expressed as an integral that is proportional to the density $\rho(\bar{k}_1)$ of photon states, and $H_0/\hbar$ reduces to $\omega_1 = c k_1$ when acting on the eigenstates to the right. Equation (15) then reduces to $$\mathscr{E}_1(R_i,t) = i\rho(\bar{k}_1)\left(\frac{\hbar \omega_1}{2\varepsilon_0 V}\right)^{1/2} \int e^{i[k \cdot R_i - ck(t-t_0)]} f_1(k) d^3k \quad (16)$$

Comparison with Equation (3) shows that, aside from a constant, this expression is equal to the gaussian function $G_1(Z_1 - c(t-t_0))$. For simplicity, we take the center of the medium to be at z=0 and evaluate the matrix elements there, since the medium has been assumed to be sufficiently thin that the modulus of the field is essentially uniform over that distance. We also choose $z_0$ and $t_0$ in such a way that the photon wave packets are centered on the medium at time t=0. In that case, these matrix elements reduce to $$\mathscr{E}_1(t) = g'e^{-i\bar{\omega}_1 t} e^{-t^2/2\tau_p^2} = \mathscr{E}_0(t) e^{-i\bar{\omega}_1 t}$$
$$\mathscr{E}_2(t) = g'e^{-i\bar{\omega}_2 t} e^{-t^2/2\tau_p^2} = \mathscr{E}_0(t) e^{-i\bar{\omega}_2 t} \quad (17)$$

where g' is a constant and $\mathscr{E}_0(t)$ is a real function that corresponds to the slowly-varying envelope of the gaussian wave packet at the location of the atoms. It should be noted that the frequency spread of the wave packets is still reflected in the time dependence of $\mathscr{E}_0(t)$ but does not appear in the exponential phase factor, which will be important in considering the effects of subsequent unitary transformations.

The matrix elements involving the modified plane-wave states can be evaluated in the same way, with the result that $$|\langle 0|E(0,t)|k\rangle| << |\langle 0|E(0,t)|\gamma_1\rangle| \quad (18)$$

for times at which the wave packets overlap the location of the medium. Here $|k\rangle = b_k^\dagger |0\rangle$ is one of the modified plane-wave basis states. This reflects the fact that the fields of photon 1 and photon 2 are concentrated in that region, whereas the plane-wave states are not localized. We therefore make the approximation that the matrix elements involving the plane-wave states can be neglected and that there is no coupling into those modes. This corresponds to the neglect of scattering and dispersion, which are expected to be small in the limit of large detunings, and it also neglects small radiative corrections such as the Lamb shift. The validity of this approximation when using a sequence of laser pulses will be discussed below.

The photon detunings, defined as $\delta_1 = \hbar\bar{\omega}_1 - e_A$ and $\delta_2 = \hbar\bar{\omega}_2 - e_A$, will be assumed to be much smaller in magnitude than $\bar{\omega}_1$ or $\bar{\omega}_2$. The rotating wave approximation (energy conservation) then ensures that the absorption of a photon must be accompanied by the excitation of an atom. Having neglected any coupling into the plane-wave states, the only states of the field that can occur when both photons propagate in the same medium, as in FIG. 7(a), are linear combinations of the states $|\gamma_1, \gamma_2\rangle$, $|\gamma_1\rangle$, $|\gamma_2\rangle$, $|0\rangle$, $|\gamma_1, \gamma_1\rangle$, and $|\gamma_1, \gamma_2\rangle$. These six basis vectors span the occupied region of Fock space for this system and the state of the field can be specified by its probability amplitudes in this basis, which form the elements of a six-dimensional state vector.

If the photons are linearly polarized along the x direction, for example, then the atomic part of the relevant matrix element is given by $$\langle\phi_{2i}|H'(t)|\phi_{1i}\rangle = -q\langle\phi_{2i}|e^{iH_0(t-t_0)/\hbar}\mathbf{x}_i e^{-iH_0(t-t_0)/\hbar}|\phi_{1i}\rangle = d_0 e^{i\epsilon_A(t-t_0)/\hbar} \quad (19)$$

where $d_0$ is the magnitude of the dipole moment between these two states. For the case of degenerate hydrogen-like atomic states, $|\phi_{2i}\rangle$ corresponds to the linear combination of states that is excited by the absorption of a linearly polarized photon.

Since there are only two incident photons, there can be at most two excited atoms, which will be labeled i and j with i>j to avoid counting the same state twice. The total number of atomic states is thus on the order of $N^2$. The basis vectors for the combined system of electromagnetic field and atoms consist of the tensor products of the various atomic states with the six field states described above. In that basis, we define $c(\gamma_1,\gamma_2)$ to be the probability amplitude to have both of the original photons and no excited atoms. The probability amplitude for atom i to be excited with photon 1 remaining will be denoted by $c(\gamma_1, i)$, while $c(\gamma_2, i)$ will denote the probability amplitude for atom i to be excited with photon 2 remaining. The probability amplitude for atoms i and j to be excited with no photons remaining will be denoted $c(0, i, j)$, with i>j. The probability amplitudes to have two identical photons and no excited atoms will be denoted by $c(\gamma_1,\gamma_1)$ and $c(\gamma_2,\gamma_2)$.

The time dependence of these probability amplitudes can be found from the Schrodinger equation, Equation (12), and the corresponding matrix elements of H'(t):

$$i\hbar\frac{d}{dt}c(\gamma_1, \gamma_2) = \sum_i M e^{i\delta_2 t/\hbar} c(\gamma_1, i) + \sum_i M e^{i\delta_1 t/\hbar} c(\gamma_2, i) \quad (20)$$

$$i\hbar\frac{d}{dt}c(\gamma_1, i) = M e^{-i\delta_2 t/\hbar} c(\gamma_1, \gamma_2) + \sum_{j<i} M e^{i\delta_1 t/\hbar} c(0, i, j) +$$
$$\sum_{j>i} M e^{i\delta_1 t/\hbar} c(0, j, i) + \sqrt{2} M e^{-i\delta_1 t/\hbar} c(\gamma_1, \gamma_1)$$

$$i\hbar\frac{d}{dt}c(\gamma_2, i) = M e^{-i\delta_1 t/\hbar} c(\gamma_1, \gamma_2) + \sum_{j<i} M e^{i\delta_2 t/\hbar} c(0, i, j) +$$
$$\sum_{j>i} M e^{i\delta_2 t/\hbar} c(0, j, i) + \sqrt{2} M e^{-i\delta_2 t/\hbar} c(\gamma_2, \gamma_2)$$

$$i\hbar\frac{d}{dt}c(0, i, j) = M e^{-i\delta_1 t/\hbar} c(\gamma_1, i) + M e^{-i\delta_2 t/\hbar} c(\gamma_2, i) +$$
$$M e^{-i\delta_1 t/\hbar} c(\gamma_1, j) + M e^{-i\delta_2 t/\hbar} c(\gamma_2, j)$$

$$i\hbar\frac{d}{dt}c(\gamma_1, \gamma_1) = \sum_i \sqrt{2} M e^{i\delta_1 t/\hbar} c(\gamma_1, i)$$

$$i\hbar\frac{d}{dt}c(\gamma_2, \gamma_2) = \sum_i \sqrt{2} M e^{i\delta_2 t/\hbar} c(\gamma_2, i)$$

Here M is a brief notation for the basic matrix element defined by $$M(t) = d_0 \mathscr{E}_0(t) \quad (21)$$

and it will be a real number for an appropriate choice of the relative phase between the two atomic states. The factors of $\sqrt{2}$ that appear in these equations are due to stimulated emission into states containing two photons or absorption from those states.

Because the atoms are all subjected to the same field, the following probability amplitudes will all be equal:

$$c(\gamma_1, i) = c(\gamma_1, i')$$
$$c(\gamma_2, i) = c(\gamma_2, i')$$
$$c(0, i, j) = c(0, i', j') \quad (22)$$

for all values of i, i', j, and j'. This allows Equation (20) to be simplified by introducing a new set of variables:

$$c(\gamma_1) \equiv \sqrt{N} \, c(\gamma_1, i)$$
$$c(\gamma_2) \equiv \sqrt{N} \, c(\gamma_2, i)$$
$$c(0) \equiv \sqrt{N(N-1)/2} \, c(0, i, j) \quad (23)$$

These new variables have been chosen in such a way that the squared modulus of $c(\gamma_1)$ gives the total probability that photon 1 is present and photon 2 has been absorbed, regardless of which atom is excited, with a similar role for $c(\gamma_2)$. The squared modulus of $c(0)$ similarly gives the total probability of there being two excited atoms and no photons. With this change of variables, Equation (20) becomes $$i\hbar\frac{d}{dt}c(\gamma_1, \gamma_2) = \sqrt{N} M e^{i\delta_2 t/\hbar} c(\gamma_1) + \sqrt{N} M e^{i\delta_1 t/\hbar} c(\gamma_2) \quad (24)$$

$$i\hbar\frac{d}{dt}c(\gamma_1) = \sqrt{N} M e^{-i\delta_2 t/\hbar} c(\gamma_1, \gamma_2) +$$
$$\sqrt{2(N-1)} M e^{i\delta_1 t/\hbar} c(0) +$$
$$\sqrt{2N} M e^{-i\delta_1 t/\hbar} c(\gamma_1, \gamma_2)$$

$$i\hbar\frac{d}{dt}c(\gamma_2) = \sqrt{N} M e^{-i\delta_1 t/\hbar} c(\gamma_1, \gamma_2) +$$
$$\sqrt{2(N-1)} M e^{i\delta_1 t/\hbar} c(0) +$$
$$\sqrt{2N} M e^{-i\delta_2 t/\hbar} c(\gamma_2, \gamma_2)$$

$$i\hbar\frac{d}{dt}c(0) = \sqrt{2(N-1)} M e^{-i\delta_1 t/\hbar} c(\gamma_1) +$$
$$\sqrt{2(N-1)} M e^{-i\delta_2 t/\hbar} c(\gamma_2)$$

$$i\hbar\frac{d}{dt}c(\gamma_1, \gamma_1) = \sqrt{2N} M e^{i\delta_1 t/\hbar} c(\gamma_1)$$

$$i\hbar\frac{d}{dt}c(\gamma_2, \gamma_2) = \sqrt{2N} M e^{i\delta_2 t/\hbar} c(\gamma_1)$$

which involves a total of six complex variables.

An inspection of Equation (24) reveals that it is equivalent to Schrodinger's equation for a six-dimensional vector whose components are taken to be $$|\psi\rangle_{eff} \equiv \begin{pmatrix} c(\gamma_1, \gamma_2) \\ c(\gamma_1) \\ c(\gamma_2) \\ c(0) \\ c(\gamma_1, \gamma_1) \\ c(\gamma_2, \gamma_2) \end{pmatrix} \quad (25)$$

provided that the Hamiltonian is chosen to be $$H_{\text{eff}} = M \begin{bmatrix} 0 & \sqrt{N}\, e^{i\delta_2 t} & \sqrt{N}\, e^{i\delta_1 t} & 0 & 0 & 0 \\ \sqrt{N}\, e^{-i\delta_2 t} & 0 & 0 & \sqrt{2(N-1)}\, e^{i\delta_1 t} & \sqrt{2N}\, e^{-i\delta_1 t} & 0 \\ \sqrt{N}\, e^{-i\delta_1 t} & 0 & 0 & \sqrt{2(N-1)}\, e^{i\delta_2 t} & 0 & \sqrt{2N}\, e^{-i\delta_2 t} \\ 0 & \sqrt{2(N-1)}\, e^{-i\delta_1 t} & \sqrt{2(N-1)}\, e^{-i\delta_2 t} & 0 & 0 & 0 \\ 0 & \sqrt{2N}\, e^{i\delta_1 t} & 0 & 0 & 0 & 0 \\ 0 & 0 & \sqrt{2N}\, e^{i\delta_2 t} & 0 & 0 & 0 \end{bmatrix} \quad (26)$$

where $\hbar$ has been omitted to make the notation more compact. Since the six components of $|\psi\rangle_{\text{eff}}$ completely determine the state of the system and their squared moduli give the total probabilities of the various photon states, we refer to $|\psi\rangle_{\text{eff}}$ as the effective state vector for the system.

The physical meaning of the effective state vector can be understood by considering the state of the full system that corresponds to each of its elements. For example, the second component of $|\psi\rangle_{\text{eff}}$ corresponds to the state $$|\Psi(\gamma_1)\rangle = \frac{1}{\sqrt{N}} \sum_i |\gamma_1, i\rangle \quad (27)$$

where each atom has an equal probability amplitude to be excited. Although there are ~N other linear combinations of the states $|\gamma_1, i\rangle$, the Hamiltonian couples the initial state only to the particular linear combination shown in Eq. (27) and all of the other linear combinations are unexcited or "dark" and can be ignored. Similar comments can be made with regard to the other components of $|\psi\rangle_{\text{eff}}$, which correspond to the probability amplitudes of the only linear combinations of states that can evolve from the initial state under the action of the Hamiltonian. The Hamiltonian of Eq. (26) could be derived in a somewhat simpler way by arbitrarily defining these six state vectors and showing that the Hamiltonian does not couple them to any other states, after which the matrix elements in Eq. (26) could be written down by inspection.

The exponential factors in Equation (26) are rapidly varying functions of time. This time variation can be eliminated by marking a unitary transformation given by $$|\psi'\rangle_{\text{eff}} = e^{-ih_0 t} |\psi\rangle_{\text{eff}} \quad (28)$$

where the matrix $h_0$ is taken to be $$h_0 = \begin{bmatrix} 0 & 0 & 0 & 0 & 0 & 0 \\ 0 & -\delta_2 & 0 & 0 & 0 & 0 \\ 0 & 0 & -\delta_1 & 0 & 0 & 0 \\ 0 & 0 & 0 & -(\delta_1 + \delta_2) & 0 & 0 \\ 0 & 0 & 0 & 0 & (\delta_1 - \delta_2) & 0 \\ 0 & 0 & 0 & 0 & 0 & (\delta_2 - \delta_1) \end{bmatrix} \quad (29)$$

After this transformation, the effective state vector obeys the equation $$i\hbar \frac{d}{dt} |\psi'\rangle_{\text{eff}} = H'_{\text{eff}} |\psi'\rangle_{\text{eff}} \quad (30)$$

where the effective Hamiltonian now has the form $$H'_{\text{eff}} = \begin{bmatrix} 0 & \sqrt{N}\,M & \sqrt{N}\,M & 0 & 0 & 0 \\ \sqrt{N}\,M & -\delta_2 & 0 & \sqrt{2(N-1)}\,M & \sqrt{2N}\,M & 0 \\ \sqrt{N}\,M & 0 & -\delta_1 & \sqrt{2(N-1)}\,M & 0 & \sqrt{2N}\,M \\ 0 & \sqrt{2(N-1)}\,M & \sqrt{2(N-1)}\,M & -(\delta_1 + \delta_2) & 0 & 0 \\ 0 & \sqrt{2N}\,M & 0 & 0 & (\delta_1 - \delta_2) & 0 \\ 0 & 0 & \sqrt{2N}\,M & 0 & 0 & (\delta_2 - \delta_1) \end{bmatrix} \quad (31)$$

Equations (30) and (31) determine the time evolution of the system for the case in which both photons propagate in the same medium, as in FIG. 7(a), and they will form the basis for most of the remaining analysis. For simplicity, the primes in Equations (30) and (31) will be omitted below.

For comparison purposes, we will also need to calculate the properties of the system when each photon propagates in a separate medium, as in FIG. 7(b). In this case, we have two independent systems whose time evolution can be calculated separately, after which the state vector for the overall system will be equal to the tensor product of the two individual state vectors. For the case in which only photon 1 is incident on a medium, an analysis similar to that presented above gives an effective state vector with the following components:

$$|\psi_1\rangle_{\text{eff}} \equiv \begin{pmatrix} c'(\gamma_1) \\ c'(0) \\ c'(\gamma_2) \end{pmatrix} \quad (32)$$

Here $c'(\gamma_1)$ is the total probability amplitude that photon 1 remains with no excited atoms, $c'(0)$ represents the probability amplitude that the incident photon has been absorbed and there is one exited atom, and $c'(\gamma_2)$ represents the probability amplitude that photon 1 has been absorbed and another photon of frequency $\bar{\omega}_2$ has been re-emitted. The effective Hamiltonian for this system is $$H_{1\,eff} = \begin{bmatrix} 0 & \sqrt{N}\,M & 0 \\ \sqrt{N}\,M & -\delta_1 & \sqrt{N}\,M \\ 0 & \sqrt{N}\,M & (\delta_2 - \delta_1) \end{bmatrix} \quad (33)$$

For the case in which only photon 2 is incident on a medium, the corresponding quantities are $$|\psi_2\rangle_{eff} \equiv \begin{pmatrix} c''(\gamma_2) \\ c''(0) \\ c''(\gamma_1) \end{pmatrix} \quad (34)$$

$$H_{2\,eff} = \begin{bmatrix} 0 & \sqrt{N}\,M & 0 \\ \sqrt{N}\,M & -\delta_2 & \sqrt{N}\,M \\ 0 & \sqrt{N}\,M & (\delta_1 - \delta_2) \end{bmatrix} \quad (35)$$

The photon wave packets have been assumed to be far from the medium at the initial time $t_0$ so that their interaction with the atoms will be exponentially small at that time. The initial state vector $|\psi_0\rangle$ is then given in the basis by $$|\psi_0\rangle = \begin{pmatrix} 1 \\ 0 \\ 0 \\ 0 \\ 0 \\ 0 \end{pmatrix} \quad (36)$$

which is an eigenstate of $H_{eff}$ with M(t)=0. It will be assumed that the gaussian wave packets are sufficiently broad that $\mathscr{E}_0(t)$ is slowly varying on the time scale set by the diagonal terms of $H_{eff}$. In that case, the adiabatic approximation is valid and the state vector will slowly evolve into the corresponding instantaneous eigenstate of $H_{eff}$. If no laser pulses are applied to the medium, the state vector will evolve back into $|\psi_0\rangle$ as the wave packets propagate away from the medium, since we have neglected scattering and dispersion.

We will primarily be interested in values of $\sqrt{N}\,M/\delta$ that are large enough to produce a perturbed state vector $|\psi(t)\rangle$ that is substantially different from $|\psi_0\rangle$ but not so large as to approach any level crossings, which would be non-adiabatic. Values of $\sqrt{N}\,M/\delta$ of this magnitude can be readily achieved in an atomic vapor cell under conditions in which the scattering and absorption are relatively small. This strongly perturbed eigenstate can be thought of as a two-photon dressed state.

Since the nonlinear interaction between two single photons is usually negligible, it might be expected that two photons would propagate independently through a medium and that the two-photon dressed state may be nothing more than the tensor product of two single-photon dressed states. That is not the case due to exchange interactions of the kind that are illustrated in FIGS. (5) and (8) In particular, FIG. (8) suggests that there should be a factor of two increase in the probability of there being two virtually-excited atoms when two photons propagate in the same medium as compared to the case in which they propagate through two separate media. In order to quantitatively investigate this possibility, we define $P_{1S}$ as the probability that there is exactly one excited atom in the medium for the case in which both photons propagate in the same medium, as in FIG. 7(*a*) and we define $P_{2S}$ as the probability that there are two excited atoms under the same conditions. We also define $P_{1D}$ and $P_{2D}$ as the corresponding probabilities when the two photons propagate in different media, as in FIG. 7(*b*). In terms of the effective probability amplitudes defined above, these probabilities are given by $$P_{1S} = |c(\gamma_1)|^2 + |c(\gamma_2)|^2 \quad (37)$$

$$P_{2S} = |c(0)|^2 \quad (39)$$

$$P_{1D} = |c'(0)|^2(1 - |c''(0)|^2) + |c''(0)|^2(1 - |c'(0)|^2) \quad (38)$$

$$P_{2D} = |c'(0)|^2|c''(0)|^2 \quad (40)$$

Constructive interference between the two processes shown in FIG. (8) then suggests that $$\frac{P_{2S}}{P_{2D}} = 2 \quad (41)$$

should hold, at least to lowest order in perturbation theory.

From the adiabatic approximation, these probability amplitudes can be found by calculating the instantaneous eigenvectors of $H_{eff}$, $H_{1\,eff}$, and $H_{2\,eff}$ that correspond to the perturbed form of the initial state vectors. For moderate values of $\sqrt{N}\,M/\delta$, the appropriate eigenvector in each case will be the one whose energy is nearest the initial value of zero. The results of a numerical calculation of the relevant eigenvectors in the limit of large N are summarized in Table (1) for the case in which $\delta_1 = -2$, $\delta_2 = 3$, and $\sqrt{N}\,M = \frac{1}{2}$. (We will specify times in units of nanoseconds and energies in units of $\hbar$ divided by 1 ns, which puts the various plots and numerical results on a scale that is typical of experiments of this kind.) The results of Table (1) were calculated numerically to an accuracy to 40 significant digits but only the first 20 digits are shown in the table. Rather than simply taking the limit of large N by replacing $\sqrt{N-1}$ by $\sqrt{N}$ in the Hamiltonians, the numerical calculations were performed using a characteristically large value for N and a correspondingly small value of M. The specific results shown in Table 1 were obtained using $N=10^{12}$ and $M=0.5\times10^{-6}$, but equivalent results were obtained for other values of these parameters. The advantage of this approach is that it includes the usual mechanisms for nonlinear optics in which both photons interact with the same atom, the magnitude of which will be seen to be a factor of 1/N smaller than the exchange interactions of interest here.

It can be seen from Table 1 that $P_{2S}/P_{2D}$ is equal to 2, as expected, to a precision of 12 significant digits. The discrepancy in the twelfth decimal place is approximately equal to 1/N, which reflects the contribution from conventional effects in which both photons do interact with the same atom. For example, the absorption of photon 1 will depopulate the ground state of one of the atoms, which in turn will prevent the virtual absorption and re-emission of photon 2 by that atom and thus give a conventional nonlinear phase shift (Kerr effect). These effects are of no interest here but they do illustrate the relatively small magnitude of conventional nonlinear interactions between individual photons. The eigenvalue calculations also showed that $P_{2S}$ is proportional to $N^2$ in the weak coupling limit ($\sqrt{N}\,M/\delta \ll 1$), as expected.

The fact that $P_{2S}/P_{2D}=2$ to such a high degree of accuracy may be somewhat surprising, since the interference of probability amplitudes illustrated in FIG. (8) corresponds only to the lowest-order Feynman diagram and it might therefore have been expected that Equation (41) may only hold to lowest order in perturbation theory. Our numerical results suggest that Equation (41) is satisfied exactly for all values of $\sqrt{N}$ M/δ in the limit of large N, at least up to the first level crossing. The fact that $P_{2S} \neq P_{2D}$ shows that there is an effective interaction between the two photons and that they do not propagate independently through the medium.

An examination of Table 1 also shows that there are some properties of the system that are the same whether the two photons propagate in the same medium or two different media. Let $E_S$ be the energy of the two-photon dressed state that occurs when both photons propagate through the same medium, and let $E_1$ and $E_2$ be the energies of the single-photon dressed states that occur when each photon propagates in a different medium. The numerical eigenvalue calculations show that $E_S = E_1 + E_2$ to within a precision of 1/N, which demonstrates that the eigenstates of the total system have the same energy in both cases in the limit of large N. If that were not the case, there would be a nonlinear phase shift even in the absence of any laser pulses or other perturbations, which is not allowed by symmetry arguments. The higher-energy eigenstates (those that do not correspond to $|\psi_0\rangle$) also have the same energies in both cases.

A similar situation can also be observed if we define $\langle N_e \rangle_S$ and $\langle N_e \rangle_D$ to be the mean number of excited atoms for the case in which the photons propagate in the same or different media:

$$\langle N_e \rangle_S = P_{1S} + 2P_{2S}$$

$$\langle N_e \rangle_D = P_{1D} + 2P_{2D} \qquad (42)$$

The numerical results of Table 1 show that $$\langle N_e \rangle_S = \langle N_e \rangle_D \qquad (43)$$

in the limit of large N, which demonstrates that the mean number of excited states is the same in the two cases; this is also required by symmetry arguments. Equations (41) through (43) can be combined to obtain the difference in the probabilities of having exactly one excited atom:

$$P_{1S} - P_{1D} = -P_{2S} \qquad (44)$$

which shows that the probability of a single-excited-atom state is reduced when both photons propagate through the same medium. This result can be understood (in the context of perturbation theory) from the fact that the generation of a two-excited-atom state must come at the expense of depleting the probability amplitudes for the one-excited-atom states.

Although the numerical calculations leave little doubt that $P_{2S}/P_{2D} = 2$ in the limit of large N, we have also obtained analytic solutions for the eigenvectors and related probabilities using Mathematical. The resulting expressions are sufficiently complex and lengthy that they are of little practical use and have not been included here. These analytic solutions also satisfy Equations (41) and (43) in the limit of large N, at least to the extent that those results are obtained when any set of numerical values of the parameters are inserted into the analytic expressions; we have not yet succeeded in simplifying the analytic expressions to obtain Equations (41) and (43) directly. The factor of 2 can be easily derived for the case of equal detunings ($\delta_1 = \delta_2$).

The factor of two increase in the probability of there being two virtually-excited atoms can be exploited in a variety of ways to produce a nonlinear phase shift. This section describes the effects of a single laser pulse, which is the simplest approach, while the next section considers the use of sequences of laser pulses to produce nonlinear phase shifts of arbitrary magnitude with minimal loss. A number of less effective approaches are described, including collisions with a buffer gas, Berry's geometric phase, and avoided level crossings.

Figure 10:
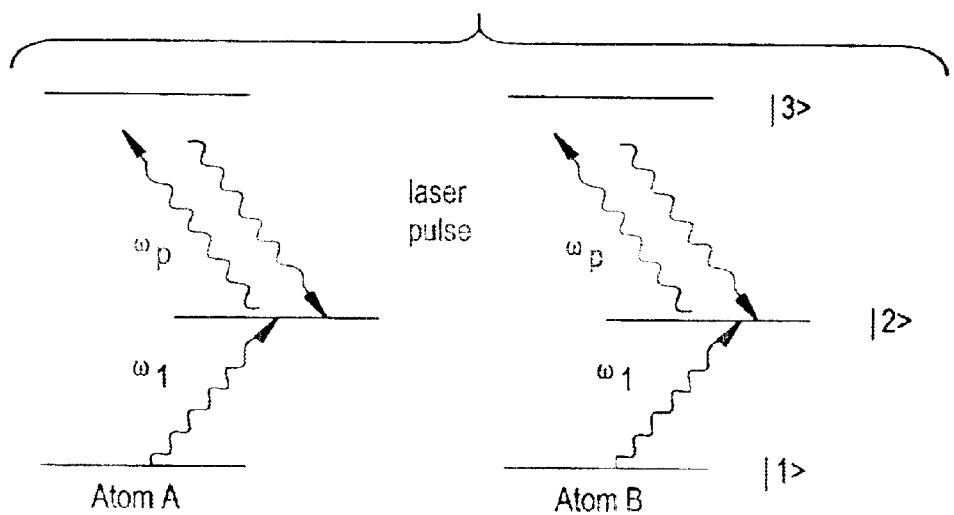
FIG. 10 illustrates the application of a laser pulse that is detuned from the transition between levels 2 and 3.
Figure 11:
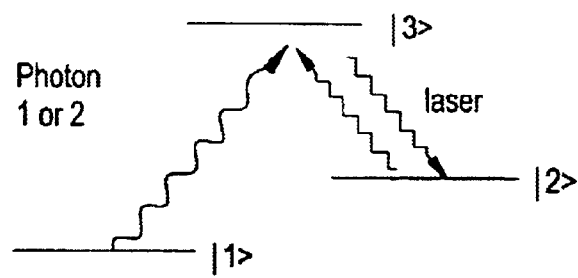
FIG. 11 illustrates a laser-induced transition, in which photon 1 or 2 is off-resonance from level 3, but the application of a laser pulse allows a resonant transition into level 2.

It will be assumed for now that a single laser pulse is applied to the medium when the photon wave packets are centered on it. The electric field of the laser pulse will produce a change in the energy of level 2 of any excited atoms via the AC Stark shift while giving a negligible transfer of population into level 3, as illustrated in FIG. 10. The duration of the laser pulse is assumed to be much shorter than the relevant time scales over which the population of the quantum states of the system can change in accordance with the Schrodinger equation and $H_{eff}$. In that case, the net effect of the laser pulse will be to produce an impulsive phase shift $\Delta\phi_e$ in the excited states of the atoms that is given by $$\Delta\varphi_e = -\int \Delta E(t) dt / \hbar \qquad (45)$$

where $\Delta E(t)$ is the change in the energy of the excited states that is produced by the application of the field. The intensity and duration of the laser pulse can be adjusted to give any desired value of $\Delta\phi_e$, which will be chosen to be $\pi/2$ for now.

If the state vector $|\psi\rangle$ had the form shown in Equation (25) immediately before the laser pulse, then immediately after the laser pulse the system will be in a new state $|\psi'\rangle$ given by $$|\psi'\rangle = \begin{pmatrix} c(\gamma_1, \gamma_2) \\ e^{i\pi/2} c(\gamma_1) \\ e^{i\pi/2} c(\gamma_2) \\ e^{i\pi} c(0) \\ c(\gamma_1, \gamma_1) \\ c(\gamma_2, \gamma_2) \end{pmatrix} \qquad (46)$$

The second and third components of the state vector correspond to a single excited atom and are subjected to a $\pi/2$ phase shift, while the fourth component corresponds to two excited atoms and experiences a total phase shift of $\pi$.

The new state vector $|\psi'\rangle$ can be conveniently expressed as a linear combination of the original state vector and another vector $|\psi_\perp\rangle$ that is orthogonal to $|\psi\rangle$:

$$|\psi'\rangle = re^{i\phi}|\psi\rangle + |\psi_\perp\rangle \qquad (47)$$

where r and $\phi$ are both real. The coefficient of the $|\psi\rangle$ term is given by the projection of $|\psi'\rangle$ onto $|\psi\rangle$:

$$re^{i\phi} = \langle\psi|\psi'\rangle = r' + i(|c(\gamma_1)|^2 + |c(\gamma_2)|^2) \qquad (48)$$

Here $$r' = |c(\gamma_1,\gamma_2)|^2 - c(0)|^2 + |c(\gamma_1,\gamma_1)|^2 + |c(\gamma_2,\gamma_2)|^2 \qquad (49)$$

is a real number that includes the contributions from the terms that were unaffected by the laser pulse as well as the contribution from the two-excited-atom state. For simplicity, we will consider the weak coupling limit in which r' is approximately equal to unity and the other terms, including $\phi$, are much smaller in comparison. Expanding the left-hand-side of Equation (48) to first order in $\phi$ then gives $$\phi = |c(\gamma_1)|^2 + |c(\gamma_2)|^2 = P_1 \qquad (50)$$

Equation (50) applies to the case in which both photons are propagating in the same medium, while a similar result applies when the photons are propagating in two different media, so that $$\phi_S = P_{1S}$$

$$\phi_D = P_{1D} \quad (51)$$

where $\phi_S$ and $\phi_D$ are the overall phase shifts in the two cases. The nonlinear phase shift $\Delta\phi_{non}$ is then equal to the difference of the two $$\Delta\phi_{non} = P_{1S} - P_{1D} \quad (52)$$

and Equation (44) gives $$\Delta\phi_{non} = -P_{2S} \quad (53)$$

in the limit of weak coupling.

Equation (53) shows that the nonlinear phase shift is directly proportional to the probability that two atoms will be virtually excited at the same time, which is a factor of two larger when the two photons propagate in the same medium due to the exchange interaction shown in FIG. (8). Based on the eigenvalue calculations of the preceding section, the nonlinear phase shift is thus expected to be proportional to $N^2$ in the weak coupling limit, which makes it much larger than the phase shift from conventional mechanisms such as that shown in FIG. 6. The nonlinearity depends on the fact that the two-excited-atom states undergo a phase shift of n, which is equivalent to a minus sign, and contribute to r' rather than to the phase shift as a result. No nonlinear phase shift would be obtained if the contribution to φ from the two-excited-atom states was simply twice the contribution from a single excited atom, as is the case in the limit of weak laser pulses ($\Delta\phi_e \ll 1$); the net phase shift would then depend only on the mean number of excited atoms, which is the same in both cases from Equation (43). This dependence on the overall phase of the two-excited-atom state can be viewed as a nonlocal property of the system, as is discussed in more detail below.

The construction of quantum logic gates will require a nonlinear phase shift of π, which cannot be produced by a single laser pulse from Equation (53). The probability of generating the orthogonal state $|\psi_\perp\rangle$ in Equation (47) must also be minimized, since it corresponds to a loss mechanism in which the system makes a transition out of the basis of states that represent the qubits in a quantum computer. For a single laser pulse, the probability of such a transition is on the order of $P_1$ and is larger than $\Delta\phi_{non}$. Both of these difficulties can be avoided by using an appropriate sequence of laser pulses designed to give a phase shift of it with $|\psi_\perp\rangle = 0$. The optimal design of pulse sequences of this kind is a nonlinear optimization problem that is still under investigation. Here we will describe two different approaches, one based on a sequence of short laser pulses as described above and a second, more efficient approach that makes use of longer pulses with narrow bandwidths.

In the first approach, a sequence of $n_P$ short pulses is applied at times $t_j$ with amplitudes $a_j$. The time intervals between the pulses were assumed to be sufficiently small compared to $\tau_P$ that $\mathscr{E}_0(t)$ was approximately constant throughout the pulse sequence. The value of $n_P$ was chosen to be sufficiently large (~10) that there were more than enough degrees of freedom to cancel all of the components of $|\psi_\perp\rangle$. A Monte Carlo approach was used in which a set of initial values for the $t_j$ and $a_j$ were chosen at random and used as the starting point for a numerical algorithm that varied the $t_j$ and $a_j$ to minimize the ratio of the loss (squared modulus of $|\psi_\perp\rangle$) divided by the net nonlinear phase shift, where the time evolution of the Schrodinger equation was calculated numerically. A random set of initial values may only lead to a local minimum, but the process was repeated many times until the optimal solution was obtained. Most of the randomly-chosen starting points lead to a solution with $|\psi_\perp\rangle = 0$ but the corresponding values of $\Delta\phi_{non}$ varied considerably.

During a laser pulse, the system will be excited into a virtual state in which the atom is in level 3 and one or both of the photons have been absorbed, as illustrated in FIG. (10). The detuning of this virtual state will be different for states $|\gamma_1\rangle$ and $|\gamma_2\rangle$, which causes the phase shift for $|\gamma_2\rangle$ to differ from that of $|\gamma_1\rangle$ by a factor $f$ that could be controlled by adjusting the frequency of the laser pulse. We included this possibility in the analysis by taking the phase shifts to be given by $$\phi_1 = \Delta\phi_e$$

$$\phi_2 = f\Delta\phi_e$$

$$\phi_0 = (1+f)\Delta\phi_e \quad (54)$$

which generalizes Equation (45). Here $\phi_1$, $\phi_2$, and $\phi_0$ are the phase shifts in the states $|\gamma_1\rangle$, $\gamma_2\rangle$, and $|0\rangle$, and the value of $\Delta\phi_e$ depends on the amplitude of the laser pulses (all the pulses were assumed to have the same duration).

The optimal results obtained for a sequence of 10 laser pulses are summarized as a function of $f$ in Table 2, where the squared modulus of $|\gamma_\perp\rangle$ after the sequence of pulses was zero in all cases. It can be seen that the optimal value of the nonlinear phase shift decreases as f approaches 1, and no solution could be found with $|\gamma_\perp\rangle = 0$ for the case of $f = 1$. This suggests that an asymmetry between the effects of photon 1 and photon 2 is required in order to obtain nonlinear phase shifts with no loss. (A similar asymmetry is also required for the case in which collisions with a buffer gas are used instead of laser pulses, as is discussed in Appendix B.) The magnitude of $\Delta\phi_{non}$ from a sequence of short pulses is relatively small in any case and this approach is straightforward but may be of limited practical value.

We have therefore investigated a more complex but much more efficient five-pulse approach that uses longer laser pulses with narrow bandwidths to produce transitions between specific states of the system. In this method, the two incident photons are assumed to be closer to resonance with level 3 than level 2, as illustrated in FIG. (11) but the detuning is still sufficiently large that the population in level 3 is relatively small. The frequency of the laser pulses can then be tuned to produce resonant transitions into level 2, where one frequency will produce a resonant absorption of photon 1 and another frequency will produce a resonant absorption of photon 2. Since level 3 is again a virtual state, the net effect can be represented as an effective matrix element for photon absorption into level 2.

The frequency and amplitude of the first laser pulse are chosen to produce a resonant absorption of photon 2 (a Rabi oscillation of π), so that the system makes a complete transition from state $|\gamma_1, \gamma_2\rangle$ to state $|\gamma_1\rangle$ as illustrated in FIG. 12. A comparison of the matrix elements of $H_{\mathit{eff}}$ in Equation (31) with $H_{2\ \mathit{eff}}$ of Equation (35) shows that the Rabi frequency for this transition is the same whether the two photons are in the same medium or in two different media, so that this transition occurs in either case.

Figure 13A:
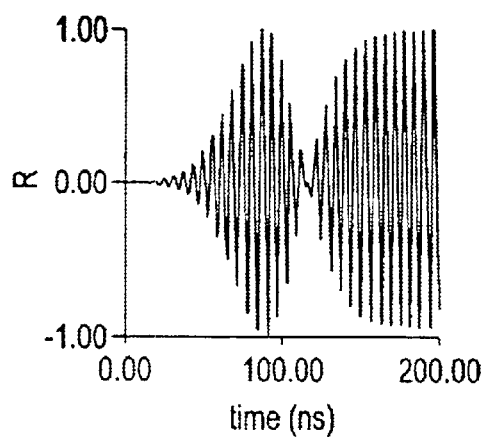
FIG. 13, consisting of FIGS. 13(a) and 13(b), illustrates plots of the real part R of the probability amplitude of state |0> as a function of time for the case in which both photons propagate in the same medium, illustrating the effects of a sequence of five laser pulses.

The frequency of the second pulse is then chosen to be on resonance for photon 1 transitions and its amplitude is adjusted to produce a complete ($2\pi$) Rabi oscillation back into the initial state $|\gamma_1\rangle$ for the case in which the two photon share in separate media. A comparison of $H_{eff}$ with $H_{1\,eff}$ now shows that the relevant matrix element is a factor of $\sqrt{2}$ larger for the case in which the two photons are in the same media due to the quantum interference of FIG. (8). As a result, the probability amplitude for state $|0\rangle$ oscillates through zero and the system is left in a superposition of $|\gamma_1\rangle$ and $|0\rangle$ in the latter case, as illustrated in FIG. 13(a). These results were obtained by numerical integration of Schrodinger's equation for a gaussian laser pulse with a width (standard deviation) of 30 ns.

The fact that the system is now in a superposition of states if and only if the photons are propagating in the same medium allows a third pulse to produce an arbitrary phase shift in that case. The frequency of pulse 3 is chosen to be slightly off-resonance from a photon 1 transition and its amplitude is chosen, once again, to return the system to state EYE> for the case in which the two photons are in different media (another $2\pi$ Rabi oscillation). The effects of this pulse on the probability amplitude of state $|\gamma_1\rangle$ for the case in which both photons propagate in the same medium can be seen from FIG. (14), where the radius of the dashed circle is equal to the modulus of the probability amplitude of this state just before the pulse. The vector labeled a in the figure represents the contribution from the probability amplitude of state $|\gamma_1\rangle$ before the pulse, which is reduced in magnitude by its coupling into state $|0\rangle$ during the pulse. The vector labeled b represents the contribution from the probability amplitude of state $|0\rangle$ before the pulse, which is coupled back into state $|\gamma_1\rangle$ during the pulse. The magnitude of vector b can be adjusted by varying the detuning of the pulse, while the phase of the pulse can be used to ensure that the sum of the two vectors lies on the dashed circle. This allows the modulus of the amplitude of state $|\gamma_1\rangle$ to be maintained at its original value while an arbitrary phase shift can be introduced by moving the resultant vector to an arbitrary point on the dashed circle.

Figure 13B:
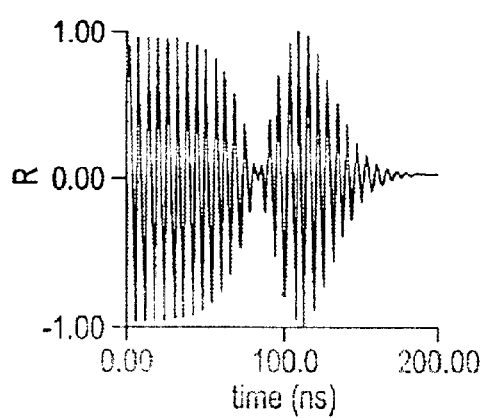
Figure 14:
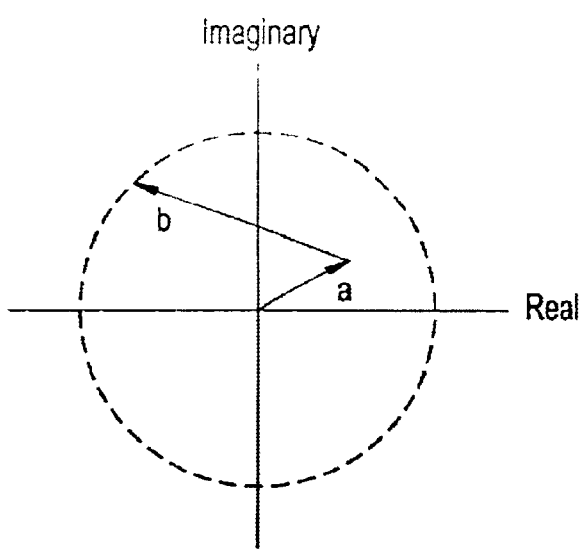
FIG. 14 illustrates real and imaginery parts of the probability amplitude of state $|\gamma_1\rangle$ as a result of pulse 3, for the case in which both photons propagate in the same medium.

The reason for maintaining the modulus of $|\gamma_1\rangle$ during pulse 3 is that it allows a fourth pulse to act as the inverse of pulse 2, since the state of the system is now the same as it was after pulse 2 except for a phase shift. The amplitude and frequency of pulse 4 are therefore chosen to be the same as pulse 2, which applies a $2\pi$ Rabi oscillation and leaves the system in $|\gamma_1\rangle$ once again for the case in which the two photons are in separate media. At the same time, the phase of this pulse can be adjusted to eliminate the $|0\rangle$ component and leave the system entirely in $|\gamma_1\rangle$ for the case in which the two photons are in the same medium, as shown in FIG. 13(b).

A fifth pulse that is identical to pulse 1 is then applied to produce a $\pi$ Rabi oscillation and transfer the system back to the original state $|\gamma_1,\gamma_2\rangle$, aside from the phase shift that was generated during pulse 3. Once again, the matrix elements and the Rabi frequency are the same for this transition whether the photons travel in the same or different media.

A numerical algorithm was used to determine the correct parameters for the five-pulse sequence described above. The net effect of the resulting pulse sequence was to produce a phase shift of $\pi$ for the case in which both photons travel through the same medium relative to the case in which they travel through two different media. Alternatively, an arbitrary nonlinear phase shift could be produced using a different choice of the frequency, amplitude, and phase of pulse 3. This approach does not produce any losses (in the form of an orthogonal state vector $|\psi_\perp\rangle$) to within the approximations that were described above.

The above analysis assumed once again that the only relevant modes of the electromagnetic field are those generated by $a_1^\dagger$ and $a_2^\dagger$. It is expected that this condition can be satisfied experimentally by using a thick medium and appropriate phase matching conditions, in which case conservation of energy and momentum can greatly suppress the emission of photons into other modes. More detailed numerical calculations that include the effects of scattering and dispersion are planned.

One question that naturally arises is whether or not these nonlinear phase shifts can be understood classically or if they are inherently quantum-mechanical in nature. In this section, we consider the possibility of describing the photons as either classical particles or as classical waves, and conclude that neither description is consistent with the observed effects. We then show that nonlinear phase shifts of this kind cannot be produced by a local polarizability of the medium and suggest that the only correct interpretation must involve nonlocal correlations between fluctuations in the polarization of the medium at two distant locations.

Figure 15A:
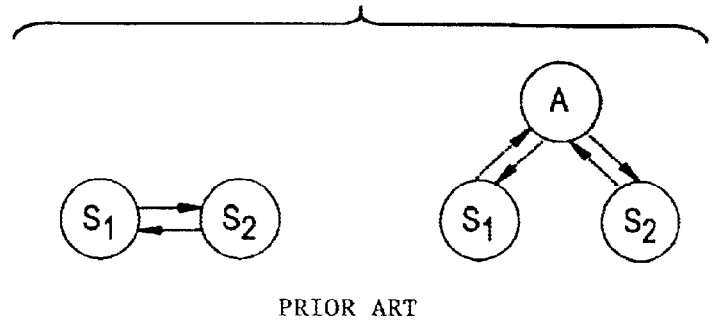
FIG. 15, consisting of FIGS. 15(a) and 15(b), illustrates, respectively, two classical systems, $S_1$ and $S_2$, that are connected by a sequence of physical interactions that may involve one or more auxiliary systems labeled A and two classical systems that are not connected by a sequence of physical interactions.
Figure 15B:
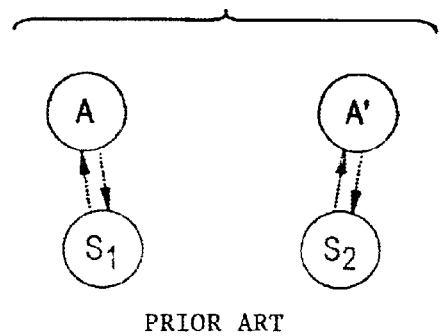

Any consistent classical interpretation would have to include the particle-like nature of light and the fact that a measurement could, at least in principle, be performed to determine which photon interacted with which atom. If we assume that the photons are classical particles, then the probability that both photons will interact with the same atom is negligible for a typical medium, as discussed above. This places a fundamental limitation on the ability of one photon to control the state of the other in any classical theory since, in general, the control of one classical system by another is only possible if there is some physical interaction (force) connecting the two systems, either directly or through a chain of interacting systems as illustrated in FIG. 15(a). No control is possible if each system interacts only within two disconnected sets of systems, as illustrated in FIG. 15(b). The sequence of physical interactions connecting the two systems in FIG. 15(a) provides a path for the flow of information from one system to the other and is consistent with the assumption that there must be a specific cause for every effect (determinism). In contrast, the quantum-mechanical exchange interaction of FIG. 8 has the same form as the two disconnected systems in FIG. 15(b), which suggests that one photon can control the state of another photon even when there is no sequence of physical interactions connecting the two particles.

Although the exchange interaction of FIG. (8) has the same form as the two disconnected systems in FIG. 15(b), we do not know which photon will interact with which atom. From a classical point of view, that uncertainty is irrelevant: if the photons never interact with the same atom, there is no path for the flow of information, regardless of which photon interacted with which atom. In quantum mechanics, the interference of these probability amplitudes gives us the possibility of a control process even though there is no classical interaction between the two photons. In the quantum-mechanical exchange interaction illustrated in FIG. (5), atom A absorbs photon 1 and re-emits photon 2, while atom B absorbs photon 2 and re-emits photon 1, which suggests that both photons must interact with both atoms in some sense in a quantum-mechanical description. This is once again irrelevant from a classical point of view, since the photons never have a causal effect on the same atom and no path for the flow of classical information can be identified as a result.

If we were to simply ignore the particle-like nature of light and represent the photons by classical waves, the intensity of the light beams would be so low that they would have negligible effect on the properties of the atoms and they could not produce a significant change in the index of refraction of the medium. For example, suppose that an absorptive filter is placed in front of the two incident beams of light in order to reduce their intensities by a large factor $f_a$. In a classical theory in which the nonlinear effects are proportional to the product of the intensities, the nonlinear phase shift would be reduced by a factor of $f_a$. In contrast, the nonlinear phase shifts of interest here would be unaffected by such an attenuation process, provided that we only accept events in which both photons are transmitted through the attenuator and actually detected. The persistence of nonlinear effects at arbitrarily low intensities is a hallmark of non-classical behavior.

More generally, it is possible to give a simple proof that the predicted phase shifts are inconsistent with any classical theory in which the medium responds locally to an applied field. To show this, we make the usual assumption that the nonlinear response of the medium can be described by a series of nonlinear susceptibility coefficients. Since there are four electric fields involved here (two incoming and two outgoing), the relevant dipole moment P(r,t) induced at location r and time t is given by $$P(r,t) = \chi^{(3)} \cdot E(r,t)^3. \quad (55)$$

where E(r,t) represents the classical field and $\chi^{(3)}$ is the third-order susceptibility coefficient. The change $\delta E(r',t')$ in the electric field produced in the forward direction can then be found by integrating over the volume of the medium $$\delta E(r',t') = \int G(r',t';r,t) P(r,t) d^3r \, dt \quad (56)$$

where G(r',t';r,t) is the appropriate Green's function. E(r,t) in Eq. (55) can be replaced by the incident field $E_0(r,t)$ in the limit of weak fields, which gives $$\delta E(r',t') = \int \dot{G}(r',t';r,t) \chi^{(3)} \cdot E_0(r,t)^3 d^3r \, dt \quad (57)$$

All of the volume elements contribute with the same phase in the forward direction, in which case the integral of Eq. (57) is proportional to the volume of the medium. Since the induced phase shift is proportional to $\delta E$, this gives a nonlinear phase shift proportional to N, not $N^2$, which shows that the local nature of the induced dipole moment precludes any description of these effects in terms of nonlinear susceptibilities.

Equation (57) shows that the nonlinear phase shift cannot be due to a local polarization of the medium, which suggests that the correct interpretation must involve nonlocal correlations between the polarizations induced at two different locations in the medium. This is consistent with the factor of 2 increase in the probability of there being two excited atoms, each of which has a dipole moment. Since the classical phase associated with a single photon is totally random, these induced dipole moments have zero mean, while the factor of 2 indicates a nonlocal correlation between the two.

These nonlinear phase shifts are due to the interference of quantum-mechanical probability amplitudes, which reflects the fact that we don't know which photon interacted with which atom. This dependence on quantum interference provides an interesting example of complementarity in quantum mechanics: In principle, a measurement could be performed to determine which photon interacted with which atom, and such a measurement would always show a negligible probability for both photons to have interacted with the same atom. On the other hand, any such measurement would also destroy the quantum interference that is responsible for the nonlinear phase shift. In that case, can we really say that the phase shift is due to photons that never interacted with the same atom? What we can say is that there is no classical interaction between the two photons, as in FIG. 15(b) and that the effect is not due to a sequence of interaction terms in the quantum-mechanical Hamiltonian, just as is the case for the usual exchange interactions.

The random nature of the quantum theory is clearly incompatible with the classical assumption that every effect must have a specific cause (determinism). This is especially true of the nonlocal correlations between the random results of measurements made on pairs of distant particles, which are inconsistent with any deterministic interpretation in which information does not travel faster than the speed of light. Our results show that the inconsistency between quantum mechanics and classical determinism is not limited to random events; a quantum control process of this kind has a definite result even though, from a classical point of view, it is not possible to identify a path for the flow of information or a specific cause for the outcome of the process.

Finally, it can be seen from Equation (46) that these effects are inherently dependent on the overall phase of a two-photon state, which is a nonlocal property of the system. As a result, there are some analogies between this effect and the two-photon interferometer which does violate Bell's inequality. Although this system does not violate Bell's inequality and the two photons have uncertain positions in overlapping beams, it seems apparent that these effects are inherently nonlocal as well as non-classical.

TABLE 1

Numerical results of an eigenvector calculation of the two-photon dressed state for the case in which $\delta_1 = -2$, $\delta_2 = 3$, $N = 10^{12}$, and $\sqrt{NM} = \frac{1}{2}$.

| | |
|---|---|
| $c(\gamma_1, \gamma_2)$ | 0.95914116322018693959 |
| $c(\gamma_1)$ | 0.15429285511676713553 |
| $c(\gamma_2)$ | -0.22765778457263702994 |
| $c(0)$ | -0.05393977193622215801 |
| $c(\gamma_1, \gamma_1)$ | 0.02198849533784590576 |
| $c(\gamma_2, \gamma_2)$ | 0.03195127659840339429 |
| $E_S$ | -0.03824511566658084533 |
| $c^1(\gamma_1)$ | 0.97183799230232851277 |
| $c^1(0)$ | -0.23453458268542568906 |
| $c^1(\gamma_2)$ | 0.02290079130406822703 |
| $E_1$ | -0.12066547333151823461 |
| $c^{11}(\gamma_2)$ | 0.98655823942131181962 |
| $c^{11}(0)$ | 0.16262496590079642855 |
| $c^{11}(\gamma_1)$ | 0.01599877169305143880 |
| $E_2$ | 0.08242035766494018749 |
| $P_{1S}$ | 0.07563435201660490531 |
| $P_{1D}$ | 0.07854385101312782591 |
| $P_{2S}$ | 0.00290949899653165949 |
| $P_{2D}$ | 0.00145474949826707732 |
| $P_{2S}/P_{2D}$ | 1.99999999999828481699 |
| $<n_e>_S$ | 0.08145335000966822429 |
| $<n_e>_D$ | 0.08145335000966198056 |
| $E_1 + E_2$ | -0.03824511566657804711 |

TABLE 2

Optimal results obtained from a sequence of 10 short laser pulses as a function of the parameter f. The condition $|\psi_\perp> = 0$ was satisfied in all cases.

| f | $\Delta\Psi_{non}$ |
|---|---|
| 2.0 | 0.318 |
| 1.1 | 0.125 |
| 1.01 | 0.022 |
| 1.00 | no solution |

Figure 4:
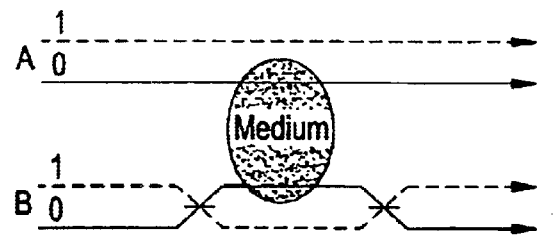
FIG. 4 illustrates optical implementation of a controlled-NOT gate.

A Controlled-NOT gate can be implemented using the interferometer arrangement (Fredkin gate) shown in FIG. 4.

Input bit A is represented by a single photon located in one of two paths, and is assigned the values 0 or 1 depending on the location of the photon as shown. For the time being, these paths can be considered to be two optical fibers. Input B is similarly represented by another photon located in one of two other paths. Photon B enters an interferometer, with one arm of the interferometer passing through a medium. This produces a phase shift if and only if photon 1 is located on the path that represents the bit 0, which also passes through the medium. The magnitude of the phase shift can be adjusted by varying the density of the atoms in the medium and constant phase shifts can be added to either path as required. Photon B will then either emerge in the same path it entered or in the opposite path, depending on the phase shift established by photon A. The net result is that bit B will be reversed if and only if bit A had the value 1.

The interferometer of FIG. 4 causes the photons to exit the gate in the desired paths, but the relative phases of the various output states do not correspond to those of the Controlled-NOT gate as conventionally defined. The desired phases can be imposed using the circuit of FIG. 16. Here a square box located in a single path represents a conventional single-photon phase shift of the kind that could be produced by a piece of glass, while a square box connected to two paths represents a nonlinear phase shift that only occurs if a photon is present in each of those paths. Once again, the desired magnitude of the nonlinear phase shifts can be achieved by varying the density of the atoms in the medium or other parameters, such as an external magnetic field. Another way, in addition to laser pulse(s), of increasing exchange interactions is to add a buffer gas, such as Argon, which increases the rate of collisions.

It is well-known that the Controlled-NOT gate, combined with trivial single-bit operations (phase shifts) is sufficient for the construction of a general quantum computer. In particular, FIG. 16 can be modified to implement a Controlled square-root of NOT gate instead, which is convenient for some applications.

The physical implementation of the nonlinear phase shifts depends on the nature of the photon paths. Basic path options include free-space propagation in beams, propagation in optical fibers, and propagation in waveguides on the surface of a substrate. The basic implementation is the same in all cases.

Figure 16:
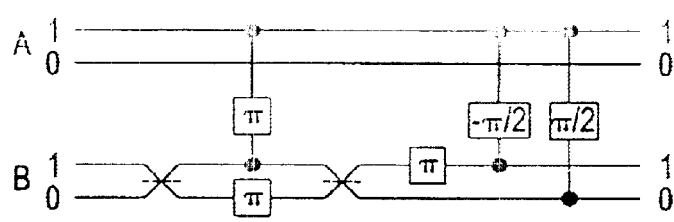
FIG. 16 illustrates an implementation of a controlled-NOT gate giving the conventional phase shifts.
Figure 17:
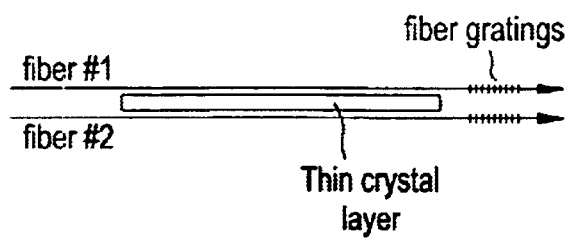
FIG. 17 illustrates the interaction of two photons in optical fibers by means of their overlapping evanescent fields in a thin crystal.

For optical fiber paths, the nonlinear phase shifts can be implemented as shown in FIG. 17. The atomic vapor cell would be replaced with a crystalline material, which has the advantage of containing a very large density of atoms. The electric fields of the two photons would interact with the medium and with each other by means of evanescent fields created by polishing or etching the fibers. (Evanescent fields of this kind are commonly used to produce directional couplers in optical fibers.) Fiber gratings would be used to restrict the output photons, which have two different frequencies, to the required set of paths A or B. (Fiber gratings of this kind are commonly created in optical fibers using photo-lithographic techniques.) FIG. 17 can now be viewed as replacing the nonlinear phase-shift boxes in circuit diagrams like FIGS. 4 and 16, while the interferometers would consist of conventional fiber-optic interferometers. FIG. 17 can also be implemented using one fiber and one crystal by having both photons travel in the same fiber.

The physical implementation for photon beams in free space would replace beam splitters with etalons tuned in such a way that photons with frequency $\omega_1$ are transmitted while photons with frequency $\omega_2$ are reflected. This would allow the two photons to be merged into a common path through an atomic vapor cell without the 50% losses associated with ordinary (frequency-independent) beam splitters. The two photons would then be separated into two different paths using their transmission or reflection from a second etalon.

The phase shift-implementation of FIG. 17 can be incorporated into the circuit diagram of FIG. 16 to provide a specific description of a Controlled-NOT logic gate.

Figure 18:
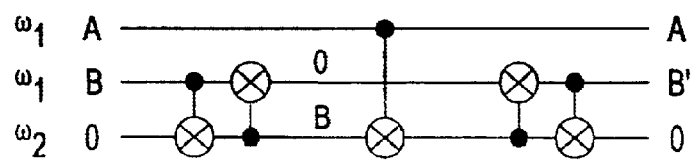
FIG. 18 illustrates a Controlled-NOT gate acting on two photons A and B with the same frequency.

The nonlinear phase shift mechanism discussed above requires that the two photons have different frequencies. In the construction of a quantum computer, it will be necessary to perform logic operations on two bits represented by photons of the same frequency. The circuit shown in FIG. 18 performs a Controlled-NOT operation on two photons of frequency $\omega_1$ by making use of a scratch bit at frequency $\omega_2$. The scratch bit is initially in the state corresponding to 0 and is returned to the state 0 at the end of the calculation, so that "garbage" bits are not accumulated. In actual practice, it would probably be more efficient to choose some of the qubits to have frequency $\omega_1$ while others have frequency $\omega_2$, which minimizes the need for this kind of circuit.

Figure 19:
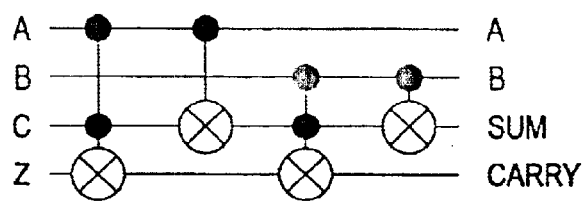
FIG. 19 illustrates a two-bit adder circuit.

The Controlled-NOT gate and the nonlinear phase shifts of FIG. 17 can be used to implement a Controlled-Controlled-NOT gate, which can then be used in the two-bit adder circuit shown in FIG. 19.

One of the major challenges in implementing any optical approach to quantum computing is the need to produce an initial state containing one and only one photon to represent each of the qubits. The most practical solution to this problem appears to be similar to the post-selection process used to obtain single-photon states, as described below.

The Controlled-NOT circuit can be used to determine whether or not there is a photon in the "0" input path (the solid line of FIG. 4) for bit A without changing the number of photons in that path, which constitutes a quantum non-demolition measurement. This can be accomplished by injecting a series of photons into one of the paths of input B and checking to see if any come out in the opposite path. By repeating the measurement with a set of different nonlinear phase shifts, one can ensure that one and only one photon A is present with an exponentially small error.

The proposed light source would be initialized with a weak coherent-state pulse in each of a large number of optical fibers, with the mean number of photons in each fiber equal to one; such a state can easily be produced from a single laser pulse and a set of directional couplers. The number of photons in each of the fibers can then be measured without changing the number of photons. Those fibers containing one and only one photon would then be switched into the input ports of the quantum computer using conventional fiber-optic switches. Such a process should be much more efficient than the use of spontaneous parametric down-conversion, for example, which gives an exponentially small probability of producing N photons at the same time.

The ability to construct quantum logic gates using optical fiber techniques, such as that shown in FIG. 17, makes it feasible to construct large numbers of logic gates at a reasonable cost. In that case, relatively complex operations, such as the addition or multiplication of entire registers, could be performed without the need for any intermediate memory storage devices. For example, the two-bit adder of FIG. 19 could be implemented exactly as shown. The calculations would proceed through a parallel network of optical fibers at roughly the speed of light. Qubits that are not being processed at any given step in the calculation would simply propagate through a length of optical fiber until the next time that they are needed.

This parallel processing capability has a number of potential advantages. There is the obvious advantage that parallel processing can substantially reduce the total computational time required, which is especially useful for quantum computing in view of the need to perform the calculations before decoherence becomes a serious problem.

Additional advantages include the simplicity of the design, which does not require any switches or separate memory devices. Connections between different fibers can be minimized or eliminated, since the logic gates can be formed by bringing the fibers close together and letting them interact via their evanescent field, as shown in FIG. 17. This may also be an important advantage, since the losses associated with connectors is expected to be a major source of technical decoherence.

The operation of a quantum computer, as well as most other applications of quantum information technology, will require the use of suitable quantum memory devices. Quantum memory devices must be capable of storing the value of a quantum bit (qubit) of information while avoiding the effects of decoherence over relatively long periods of time. The sequence of laser pulses described in FIG. 12 and used there to perform a quantum logic operation can be modified to store a qubit of information instead. In that case, pulse one can be used to absorb either photon and store its information (presence or absence of the photon, or the polarization of the photon) in a superposition of excited atomic states in a suitable solid-state material, such as various crystals. The information will be stored in the crystal until another pulse is applied; this is equivalent to the fifth pulse shown in FIG. 12, which has the effect of causing the crystal to re-radiate the photon in the same direction and with the same frequency that it had originally. Thus, in a quantum memory device of this kind, only two pulses would be used, one to store the information and the other to reproduce the original qubit on demand. Coherent memory storage times that are long enough to perform roughly one million quantum logic operations should be achievable in this way. That is sufficiently long to allow the use of quantum error correction methods to extend the coherent storage time indefinitely.

Useful calculations on a quantum computer may require up to $10^{12}$ operations. It does not appear feasible to perform that number of operations without the use of memory devices, even taking into account a large degree of parallelism. Nevertheless, parallel processing of this kind may still be applied to perform relatively complex mathematical operations within the computer as a whole.

If the nonlinear phase-shift device shown in FIG. 17 has a length of 1 cm, for example, then the amount of time $\Delta t_{op}$ required to perform a logic operation would be on the order of 33 picoseconds, the transit time at the speed of light. The minimum attenuation factor for commercial fibers is 0.16 dB/km, which means that a photon can travel roughly 20 km before it has a 50% probability of being absorbed. Quantum cryptography experiments in optical fibers, as well as two-photon interferometer experiments, have shown that the quantum-mechanical coherence of qubits can be maintained over these distances, which correspond to a propagation time of approximately 130 microseconds. Based on these numbers, a photon can be stored in an optical fiber loop long enough to perform roughly $4 \times 10^6$ logic operations.

Figure 20:
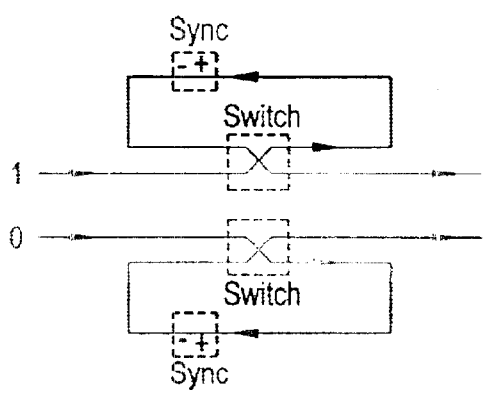
FIG. 20 illustrates a memory storage device consisting of two loops of optical fiber with electro-optical switches.

If $10^{12}$ logic operations are required, then the storage time of photons in an optical fiber loop is clearly inadequate. On the other hand the fact that the intrinsic storage time is much longer than $\Delta t_{op}$ means that various error correction techniques can be applied to extend the effective storage time $\Delta t_{store}$ a much larger value. This illustrated by the proposed memory device shown in FIG. 20 which contains two fiber loops, one to represent the logical value 0 and the other to represent the logical value 1. Conventional fiber-optic switches would be used to place the photon into a storage loop and then to retrieve it at the desired time. (Commercially-available switches of this kind consist of a fiber-optic interferometer with an electro-optically controlled phase shift.)

Error-correction techniques using redundant bits can then be used to "protect" the information against any single decohering event. Provided that the bits are monitored at sufficiently short intervals, the effective storage time can be greatly increased. The quantum non-demolition measurements mentioned earlier can be put to good use here, since it is possible to check for the most common error source (absorption) without disturbing the value of the qubit; one can measure the total number of photons in the two loops without determining which loop the photon is in. This allows frequent checks to ensure that no more than one error has occurred, at which time the error-correction techniques can be used to restore the correct qubit. This suggests that the effective storage time of these devices is limited only by the performance of the basic quantum gates.

Most of the errors in a device of this kind would probably be due to the switches rather than the fibeptic loop. This problem can be mini by having a range of storage registers with different lengths of fiber loops. Since the time at which a qubit will need to be retrieved is often known in advance, the qubits can be stored in memory devices whose loops have the correct lengths so that only a few transits through the switch are necessary.

An additional problem with this type of memory storage device, or with optical approaches in general, is that dispersion will eventually change the shape of the photon wave packets and cause them to arrive at logic gates at somewhat different times. Dispersion effects can be minimized by using the synchronization (sync) devices included in both loops of FIG. 20. These are (classical) nonlinear devices that are switched on at well-defined times in the computer clock cycle. Each sync device consists of an electro-optic material whose index of refraction is turned on by the trigger and has a spatially-varying index of refraction. The index of refraction is higher on the left side of the device, so that photons that are ahead of their nominal position are slowed down. The index of refraction is lower on the right side of the device, so that photons that are behind their nominal position will be sped up.

It is believed that the operation of these devices would limit the effects of dispersion and that an equilibrium condition would be reached in which no further dispersion of the wave packets would occur. This situation is somewhat similar to Anderson localization, which bounds dispersion in some solid-state systems. Other methods for controlling dispersion would make use of the nonlinear nature of the quantum logic gates themselves, which can be used to "reverse" dispersion that has already occurred; this is analogous to the pulse-narrowing techniques commonly used in nonlinear optics and pulsed lasers. A combination of these methods would probably be required.

At the end of a calculation, it will be necessary to measure the contents of one or more qubit registers. High-efficiency photon detectors will be required for that purpose.

One single-photon detector currently in use has a measured efficiency of 74%. Most of this inefficiency is due to the reflection of photons from the surface of the detector. Focusing the reflected photons onto a second detector and then a third, achieves efficiencies on the order of 99%.

Although further refinements in this technique are required, this suggests that conventional approaches may eventually give single-photon detection efficiencies of 99% on a routine basis.

Even higher detection efficiencies can be obtained by once again making use of the fact that the Controlled-NOT circuit of FIG. 4 can be used as a quantum non-demolition measurement of the number of photons. Since such a process can be repeated many times, the probability of not detecting a photon would become exponentially small. Thus the ultimate single-photon detection efficiency will depend on the performance of the basic quantum logic gates described above.

Based on the underlying theoretical calculations, a number of sources of intrinsic or physical decoherence have been identified. These include:

Linear absorption
Nonlinear absorption
Recoil momentum
Collisions
Atomic density fluctuations Linear absorption corresponds to the usual attenuation of a photon beam passing through the medium in the absence of any other photons. Since the energy absorbed by the atoms is usually re-emitted in the form of another photon, most of this "absorption" corresponds to scattering of the photons. It is well known that scattering of this kind can be reduced to a negligible level by detuning the photons far from the resonant frequency of the atoms, where the real part of the index of refraction becomes much larger than the imaginary part. This is the reason that a piece of glass is transparent, and the same effect should hold true for the logic gates of the invention.

Nonlinear absorption is the additional scattering that occurs when two or more photons are present in the medium at the same time, as discussed above. This form of scattering also becomes negligible for large detuning, and the situation is analogous to the transparency of commonly-used nonlinear crystals, such as lithium iodate.

The role of recoil momentum in decoherence becomes negligible for large numbers of atoms in the medium. This is because the rate of incoherent events is proportional to the number of atoms in the medium, while the coherent phase shifts of interest are proportional to the square of the number of atoms. The same situation is expected to hold true for the decoherence due to collions with a buffer gas, if used.

Atomic density fluctuations produce variations in the nonlinear phase shift produced by the medium. These fluctuations also become negligible as the number of atoms in the medium is increased.

For the above reasons, all of the known sources of intrinsic decoherence are expected to become negligible compared to the technical decoherence of sufficiently large detunings and for sufficiently large numbers of atoms. If the technical decoherence is assumed to be on the order of $10^{-3}$ per logic operation, then, according to the theory, this would require that the detuning be greater than $10^3$ line widths and that the number of atoms be greater than $10^6$. Both of these conditions appear to be feasible.

The following sources of technical decoherence have been identified:

Absorption and scattering in the optical fibers or waveguides
Losses in the fiber-optic switches
Dispersion
Incorrect magnitude of the nonlinear phase shift
Losses in the fiber-optic connectors Absorption in currently-available waveguide structures is obviously too large to allow the application of the techniques of the invention in a pure surface structure. Future advances in this area may allow hybrid devices where some of the functions are performed using waveguide structures while memory devices utilize fiber loops.

As discussed above, the absorption due to scattering in commercially-available fibers limits the intrinsic storage time of the photon qubits to roughly $4 \times 10^6$ logic operations, which corresponds to a memory error rate of $10^{-6}$ per operation. This is lower than that of other expected technical decoherence sources, and it is expected that error-correction techniques could compensate for it.

Losses in the fiber-optic switches are primarily due to phase errors in these fiber-optic interferometers. Visibilities of better than 99% are routinely achieved in fiber-optic interferometers, and it seems plausible that phase errors of this kind could be reduced to less than $10^{-3}$ using the feedback techniques to be described below. Once again, losses in waveguide structures may be prohibitive and it may be necessary to use all-fiber devices similar to that shown in FIG. 17 but with a classical electro-optic medium.

Dispersion is potentially a serious problem and will require some form of compensation. Several mechanisms have been identified for this purpose, as discussed above, but none have been analyzed in detail. In principle, there is no reason that dispersion cannot be reduced to an insignificant level, but detailed calculations and experiments are required in order to provide a quantitative estimate of the likely errors due to dispersion.

Figure 21:
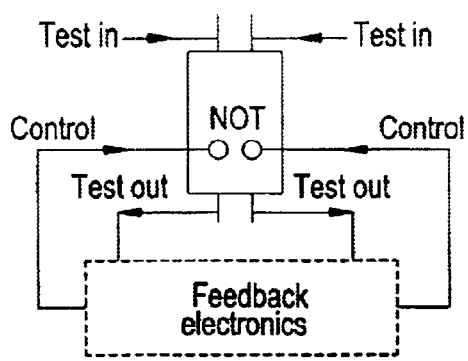
FIG. 21 illustrates the use of feedback to minimize the effects of phase errors.

The magnitude of the nonlinear phase shift applied in any given quantum logic gate will be affected by such factors as variations in the geometry of the device, magnitude of the detuning, and atomic density in the medium. Errors of this kind could be reduced to a very small level using feedback techniques that have been employed in systems for quantum cryptography, which is sensitive to similar phase errors. As illustrated in FIG. 21 test photons that are not part of the actual calculation would periodically be sent through the logic gates and the results measured. An appropriate correction to the phase shift can then be applied by varying an external magnetic field, for example. Based on past experience, this approach should be able to reduce such systematic errors to the $10^{-3}$ level. It is expected that feedback of this kind would be a necessary part of each gate.

Some losses will inevitably occur at the connection between two optical fibers. Commercially-available fiber splicing systems currently achieve loss factors of 0.003 per connection. These losses can be minimized to some extent by using parallel processing algorithms, as discussed above. Future improvements in splicing systems could reasonably be expected to reduce these losses to below the $10^{-3}$ level.

All of the technical sources of decoherence, with the possible exception of dispersion, could eventually be reduced to less than $10^{-3}$ per operation based only on refinements of more-or-less standard optical techniques. Optical measurements are routinely made with that precision.

It has been recently estimated that, when one takes into account the extra qubits required for error correction, the total number of qubits required to perform a useful calculation, such as factoring a large integer, would be on the order of $10^6$. It is hard to imagine how some of the other proposed quantum computer implementations could be scaled up to this number of qubits. For example, the cavity-QED approaches would require a million cavities and traps, while an ion trap containing a million ions seems to be out of the question. If one is seriously interested in the possibility of building a practical quantum computer, then one must ask whether or not a potential approach can be scaled up to the necessary number of bits.

One of the major advantages of the approach of the invention is that each of the quantum logic gates is physically separate from all the others, unlike the situation for an ion trap. If one quantum logic gate can be built that works well, then as many as is desired can be built, aside from the cost. The other major advantage of the approach of the invention is that it does not require complicated structures, such as extremely high-Q cavities, atomic beams, atomic traps, etc. As a result, quantum logic gates based on the structure shown in FIG. 17 may eventually be mass fabricated at a sufficiently low cost that an actual computer could be made.

The previous discussion of single-photon sources, memory storage devices, and high-efficiency photon detectors indicates that all of these functions are dependent on the performance of the basic logic gate. The ultimate performance of these devices will be limited primarily by the quality of the gates.

The discussion above suggests that the error per logic operation will be limited by technical decoherence, not physical decoherence, and that those errors, with the possible exception of dispersion, might reasonably be reduced to less than $10^{-3}$. Optical measurements in general are often performed with that degree of accuracy.

Quantum computing is a promising new technique that may eventually provide the ability to perform numerical calculations not possible with conventional computers. These enhanced capabilities result from the use of nonclassical logic elements and the ability of a quantum computer to perform many calculations in parallel on a single processor. The advent of quantum computers would revolutionize computer science and information theory. The invention's optical approach to quantum computing has a number of advantages over other potential methods including the ability to construct independent logic gates that can be connected with optical fibers or waveguides, the ability to minimize decoherence by using large detunings, and the lack of any requirement for high-Q cavities, atomic beams, or traps.

I claim:

1. A method for producing a nonlinear phase shift involving off-resonant photons comprising the steps of:

propagating two off-resonant photons together through a medium containing a plurality of pairs of atoms to produce exchange interactions between the photons and a pair of atoms, thereby placing the atoms in an excited state; and perturbing the excited states of the atoms to produce a phase shift in the excited states of the atoms, the increase in phase shift when the two photons are together in the same medium being nonlinear over the increase when the two photons are not together in the medium.

2. The method for producing a nonlinear phase shift as recited in claim 1, the perturbing step comprising the step of applying a laser pulse to the medium to perturb the excited states of the atoms.

3. The method for producing a nonlinear phase shift as recited in claim 1, the perturbing step comprising the step of applying a plurality of laser pulses to the medium to perturb the excited states of the atoms.

4. The method for producing a nonlinear phase shift as recited in claim 1, the perturbing step comprising the step of adding a buffer gas to the medium to increase the number of collisions between the photons and atoms and, therefore, increase the number of exchange interactions, and therefore, increase the size of the nonlinear phase shift.

* * * * *